(12) United States Patent
Desberg et al.

(10) Patent No.: US 12,059,971 B2
(45) Date of Patent: Aug. 13, 2024

(54) ELECTRIC SCOOTER WITH REMOVABLE BATTERY

(71) Applicant: Razor USA LLC, Cerritos, CA (US)

(72) Inventors: Ian Desberg, Cerritos, CA (US); Marco Alferez, Cerritos, CA (US)

(73) Assignee: Razor USA LLC, Cerritos, CA (US)

( * ) Notice: Subject to any disclaimer, the term of this patent is extended or adjusted under 35 U.S.C. 154(b) by 209 days.

(21) Appl. No.: 17/396,226

(22) Filed: Aug. 6, 2021

(65) Prior Publication Data

US 2022/0048402 A1   Feb. 17, 2022

Related U.S. Application Data

(60) Provisional application No. 63/062,838, filed on Aug. 7, 2020.

(51) Int. Cl.
*B60L 53/80* (2019.01)
*B62K 3/00* (2006.01)
*B62K 23/02* (2006.01)
*H01M 50/249* (2021.01)

(52) U.S. Cl.
CPC .............. *B60L 53/80* (2019.02); *B62K 3/002* (2013.01); *B62K 23/02* (2013.01); *H01M 50/249* (2021.01); *B62K 2202/00* (2013.01); *H01M 2220/20* (2013.01)

(58) Field of Classification Search
CPC . B60L 53/80; H01M 50/249; H01M 2220/20; B62K 3/002; B62K 23/02; B62K 2202/00; B62K 11/00
See application file for complete search history.

(56) References Cited

U.S. PATENT DOCUMENTS

| 213,546 A | 3/1879 | Cornelius |
| 215,081 A | 5/1879 | Turnbull |
| 252,970 A | 1/1882 | Price et al. |

(Continued)

FOREIGN PATENT DOCUMENTS

| AU | 2005100475 | 6/2005 |
| CH | 598051 | 4/1978 |

(Continued)

OTHER PUBLICATIONS

The translation of Sun (CN 109927829 A) relied upon in this office action is included for clarity of the record. (Year: 2019).*

(Continued)

*Primary Examiner* — James A Shriver, II
*Assistant Examiner* — Nicholas R. Kandas
(74) *Attorney, Agent, or Firm* — Knobbe, Martens, Olson & Bear, LLP

(57) ABSTRACT

Various electric scooters are disclosed that include a battery receptacle configured to releasably retain a rechargeable battery therein. The electric scooter may include a deck and a strut extending between the deck and a rotatable shaft connected to a handlebar assembly. The battery receptacle may be supported by the strut, and the battery may be insertable into and removed from the battery receptacle through translation of the battery in a direction substantially parallel to a longitudinal axis of the strut. The battery may be configured for use in a power tool in addition to the electric scooter.

20 Claims, 15 Drawing Sheets

(56) References Cited

U.S. PATENT DOCUMENTS

| | | |
|---|---|---|
| 253,735 A | 2/1882 | Marshall |
| 304,949 A | 9/1884 | Mitchell |
| 311,936 A | 2/1885 | Wisewell |
| 319,839 A | 6/1885 | Nelson |
| 321,434 A | 7/1885 | Hanson |
| 321,466 A | 7/1885 | Wall |
| 329,927 A | 11/1885 | Mendenhall |
| 1,018,512 A | 2/1912 | Mees |
| 1,075,250 A | 10/1913 | Gingold |
| 1,194,102 A | 8/1916 | Webb |
| 1,387,091 A | 8/1921 | Woolley et al. |
| 1,550,985 A | 8/1925 | Schluesselburg |
| 1,603,529 A | 10/1926 | Faust |
| 1,632,997 A | 6/1927 | Connolly |
| 1,728,063 A | 9/1929 | James |
| 1,784,761 A | 12/1930 | Smith |
| 1,854,188 A | 4/1932 | Gregory |
| 1,935,187 A | 11/1933 | Kitselman |
| 2,051,762 A | 8/1936 | Vincent |
| 2,077,274 A | 4/1937 | Silkman |
| 2,126,359 A | 8/1938 | Vogt |
| 2,136,306 A | 11/1938 | McCloy |
| 2,216,359 A | 10/1940 | Spencer |
| 2,413,530 A | 12/1946 | Taylor |
| 2,430,037 A | 11/1947 | Vincent |
| 2,474,082 A | 6/1949 | Wutz |
| 2,509,324 A | 5/1950 | Horn |
| 2,857,008 A | 10/1958 | Antonio |
| 3,087,739 A | 4/1963 | Ware |
| 3,252,713 A | 5/1966 | Heller |
| 3,288,251 A | 11/1966 | Sakwa |
| 3,331,612 A | 7/1967 | Tietge |
| D214,252 S | 5/1969 | Andersen |
| 3,476,399 A | 11/1969 | Finn |
| 3,570,620 A | 3/1971 | Fischer et al. |
| 3,671,055 A | 6/1972 | Aarup |
| D226,440 S | 3/1973 | Bentley |
| 4,003,582 A | 1/1977 | Maurer |
| 4,037,852 A | 7/1977 | Bayer et al. |
| 4,043,566 A | 8/1977 | Johnson |
| 4,061,350 A | 12/1977 | Schmidt, Jr. et al. |
| 4,094,372 A | 6/1978 | Notter |
| 4,127,282 A | 11/1978 | Gorlach |
| 4,152,001 A | 5/1979 | Christianson |
| 4,168,076 A | 9/1979 | Johnson |
| 4,180,278 A | 12/1979 | Gottlieb |
| 4,185,847 A | 1/1980 | Johnson |
| 4,272,091 A | 6/1981 | Ried, Jr. |
| 4,398,735 A | 8/1983 | Evans et al. |
| 4,402,521 A | 9/1983 | Mongeon |
| 4,403,784 A | 9/1983 | Gray |
| 4,417,737 A | 11/1983 | Suroff |
| 4,504,072 A | 3/1985 | Klawitter |
| 4,508,187 A | 4/1985 | Wenzel |
| 4,523,767 A | 6/1985 | Le Page |
| 4,546,841 A | 10/1985 | Sipiano |
| 4,681,333 A | 1/1987 | Rouge et al. |
| 4,645,223 A | 2/1987 | Grossman |
| 4,708,352 A | 11/1987 | Vullierme |
| 4,709,937 A | 12/1987 | Lin et al. |
| 4,738,456 A | 4/1988 | Creason |
| D299,260 S | 1/1989 | Vullierme |
| 4,842,091 A | 6/1989 | Badsey |
| 4,844,491 A | 7/1989 | Wheelwright |
| 4,930,794 A | 6/1990 | Chan |
| 4,955,626 A | 9/1990 | Smith et al. |
| 4,998,358 A | 3/1991 | Girardelli |
| 5,046,747 A | 9/1991 | Nielsen |
| 5,062,630 A | 11/1991 | Nelson |
| 5,092,614 A | 3/1992 | Malewicz |
| D326,290 S | 5/1992 | Badsey |
| 5,143,388 A | 9/1992 | Chen |
| 5,232,235 A | 8/1993 | Brooks |
| 5,236,058 A | 8/1993 | Yamet et al. |
| 5,263,725 A | 11/1993 | Gesmer et al. |
| 5,330,026 A | 7/1994 | Hsu et al. |
| 5,347,681 A | 9/1994 | Wattron et al. |
| 5,513,863 A | 5/1996 | Klamer et al. |
| 5,513,865 A | 5/1996 | Brooks et al. |
| 5,547,204 A | 8/1996 | Gamzo |
| 5,662,187 A | 9/1997 | McGovern |
| 5,730,241 A | 3/1998 | Shyr et al. |
| 5,741,018 A | 4/1998 | Huang |
| D395,479 S | 6/1998 | Gamzo |
| 5,797,466 A | 8/1998 | Gendle |
| 5,829,543 A | 11/1998 | Diaz |
| 5,848,660 A | 12/1998 | McGreen |
| 5,860,657 A | 1/1999 | Kroher |
| D410,268 S | 5/1999 | Yung |
| 5,915,707 A | 6/1999 | Steffen |
| 5,950,754 A | 9/1999 | Ondrish, Jr. |
| 5,971,411 A | 10/1999 | Jones et al. |
| 5,997,018 A | 12/1999 | Lee |
| D421,282 S | 2/2000 | Orr |
| 6,029,763 A | 2/2000 | Swisher |
| 6,050,357 A | 4/2000 | Staelin et al. |
| D424,979 S | 5/2000 | Hanagan et al. |
| 6,059,062 A | 5/2000 | Staelin |
| 6,070,885 A | 6/2000 | Ferone |
| 6,079,724 A | 6/2000 | Lin |
| 6,139,035 A | 10/2000 | Tsai |
| D433,718 S | 11/2000 | Mcgreen |
| 6,158,752 A | 12/2000 | Kay |
| D435,873 S | 1/2001 | Lee |
| D435,874 S | 1/2001 | Cheng |
| 6,179,307 B1 | 1/2001 | Mao |
| 6,189,898 B1 | 2/2001 | Benoit |
| D438,911 S | 3/2001 | Chen |
| D438,912 S | 3/2001 | Barrera |
| D439,623 S | 3/2001 | Barrera |
| 6,199,652 B1 | 3/2001 | Mastroianni et al. |
| 6,206,387 B1 | 3/2001 | Tsai |
| 6,206,388 B1 | 3/2001 | Ouboter |
| 6,227,324 B1 | 5/2001 | Sauve |
| 6,234,501 B1 | 5/2001 | Chen |
| 6,241,264 B1 | 6/2001 | Page |
| D444,824 S | 7/2001 | Udwin et al. |
| D445,145 S | 7/2001 | Yang |
| D446,259 S | 8/2001 | Udwin et al. |
| D447,187 S | 8/2001 | Powers |
| D447,188 S | 8/2001 | Lan |
| 6,270,095 B1 | 8/2001 | Chang |
| 6,273,205 B1 | 8/2001 | Tsai |
| 6,283,485 B1 | 9/2001 | Tsai |
| 6,286,632 B1 | 9/2001 | Chai |
| 6,286,843 B1 | 9/2001 | Lin |
| 6,296,082 B1 | 10/2001 | Tsai |
| 6,298,952 B1 | 10/2001 | Tsai |
| 6,299,186 B1 | 10/2001 | Kao et al. |
| 6,302,415 B1 | 10/2001 | Wang et al. |
| D450,355 S | 11/2001 | Chan |
| D452,284 S | 12/2001 | McGinnis |
| D453,198 S | 1/2002 | Dudley |
| D453,804 S | 2/2002 | Robinson |
| 6,345,678 B1 | 2/2002 | Chang |
| 6,345,827 B1 | 2/2002 | Benoit |
| D454,377 S | 3/2002 | Hsu et al. |
| 6,352,270 B1 | 3/2002 | Wu |
| D456,460 S | 4/2002 | Tseng |
| 6,378,880 B1 | 4/2002 | Lin |
| 6,382,366 B1 | 5/2002 | Chang |
| 6,386,330 B1 | 5/2002 | Wei |
| 6,394,213 B1 | 5/2002 | Tsai |
| 6,406,039 B1 | 6/2002 | Chen |
| 6,409,190 B1 | 6/2002 | Tsai |
| D459,761 S | 7/2002 | Chen |
| 6,416,060 B1 | 7/2002 | Chen |
| 6,416,063 B1 | 7/2002 | Stillinger et al. |
| 6,428,021 B1 | 8/2002 | Tung |
| 6,428,050 B1 | 8/2002 | Brandley et al. |
| 6,435,528 B1 | 8/2002 | Tsai |
| 6,443,470 B1 | 9/2002 | Ulrich et al. |
| D464,379 S | 10/2002 | Lin |
| 6,462,493 B2 | 10/2002 | Lan |

(56) References Cited

U.S. PATENT DOCUMENTS

| | | |
|---|---|---|
| 6,467,560 B1 | 10/2002 | Anderson |
| 6,481,728 B2 | 11/2002 | Chen |
| 6,481,729 B2 | 11/2002 | Herman et al. |
| 6,481,913 B2 | 11/2002 | Chen |
| D468,236 S | 1/2003 | Pollitzer et al. |
| D471,597 S | 3/2003 | Chen |
| D471,598 S | 3/2003 | Chen |
| 6,533,054 B1 | 3/2003 | Fey |
| D472,596 S | 4/2003 | Schnuckle et al. |
| D473,905 S | 4/2003 | Schnuckle et al. |
| D475,093 S | 5/2003 | Furter et al. |
| 6,557,861 B2 | 5/2003 | Saylor |
| 6,557,873 B2 | 5/2003 | Nardone |
| 6,604,593 B1 | 8/2003 | Mullet |
| 6,612,592 B1 | 9/2003 | Soo |
| 6,619,416 B2 | 9/2003 | Lan |
| 6,619,679 B2 | 9/2003 | Lan |
| D482,750 S | 11/2003 | Magerer et al. |
| 6,672,607 B2 | 1/2004 | Chung |
| 6,676,138 B1 | 1/2004 | Rosso |
| 6,679,505 B2 | 1/2004 | Yang |
| D486,532 S | 2/2004 | Christianson |
| 6,739,421 B1 | 5/2004 | Miya |
| D492,367 S | 6/2004 | Dennis |
| 6,796,394 B1 | 9/2004 | Lin |
| D497,397 S | 10/2004 | Sramek |
| 6,832,660 B2 | 12/2004 | Dodd |
| D505,469 S | 5/2005 | Joung et al. |
| D513,629 S | 1/2006 | Sramek |
| 6,981,711 B2 | 1/2006 | Seta |
| D516,132 S | 2/2006 | Sramek |
| 7,007,977 B1 | 3/2006 | Gallagher |
| D527,536 S | 9/2006 | Mcoy |
| 7,150,461 B2 | 12/2006 | Schnuckle et al. |
| 7,156,405 B1 | 1/2007 | Ming |
| 7,163,210 B1 | 1/2007 | Rehkemper et al. |
| 7,204,330 B1 | 4/2007 | Lauren |
| 7,214,337 B2 | 5/2007 | Grande |
| 7,226,063 B2 | 6/2007 | Paddock |
| 7,232,139 B2 | 6/2007 | Cole |
| 7,351,265 B2 | 4/2008 | Vitale et al. |
| D569,447 S | 5/2008 | Thomas |
| D574,296 S | 8/2008 | Keski-Luopa |
| 7,419,171 B1 | 9/2008 | Ka |
| 7,431,110 B2 | 10/2008 | Greenwood et al. |
| D579,987 S | 11/2008 | Hong |
| D581,991 S | 12/2008 | Armand et al. |
| 7,584,974 B2 | 9/2009 | Jackman et al. |
| D603,463 S | 11/2009 | Jessie, Jr. |
| 7,610,972 B2 | 11/2009 | Adams et al. |
| 7,654,356 B2 | 2/2010 | Wu |
| D623,701 S | 9/2010 | Dalgard et al. |
| 7,900,731 B2 | 3/2011 | McKinzie |
| 7,976,035 B2 | 7/2011 | Chan |
| 7,980,567 B2 | 7/2011 | Yu et al. |
| 7,988,159 B2 | 8/2011 | Chen |
| D645,522 S | 9/2011 | Powers et al. |
| 8,025,300 B1 | 9/2011 | Jordan |
| D654,963 S | 2/2012 | Powers et al. |
| D656,560 S | 3/2012 | Patterson et al. |
| 8,146,947 B2 | 4/2012 | Hadley |
| 8,186,693 B2 | 5/2012 | Kortschot |
| 8,251,377 B2 | 8/2012 | Green et al. |
| 8,292,018 B2 | 10/2012 | Huang |
| 8,292,308 B2 | 10/2012 | Green et al. |
| D671,600 S | 11/2012 | Horne |
| D672,400 S | 12/2012 | Pizzi |
| 8,348,284 B2 | 1/2013 | Green |
| D678,124 S | 3/2013 | Canni et al. |
| D681,759 S | 5/2013 | Treadway et al. |
| D684,217 S | 6/2013 | Hadley |
| D686,674 S | 7/2013 | Hadley et al. |
| 8,490,985 B2 | 7/2013 | Landau |
| D687,499 S | 8/2013 | Horne |
| D691,671 S | 10/2013 | Chen et al. |
| D692,963 S | 11/2013 | Radtke et al. |
| D693,414 S | 11/2013 | Hadley et al. |
| D695,644 S | 12/2013 | Timonen |
| D698,868 S | 2/2014 | Chan |
| 8,668,039 B2 | 3/2014 | Tuli |
| 8,672,074 B2 | 3/2014 | Ganeous |
| 8,684,121 B2 | 4/2014 | Treadway |
| 8,727,359 B2 | 5/2014 | Green |
| D710,949 S | 8/2014 | Huang |
| 8,813,892 B2 | 8/2014 | Hadley et al. |
| D714,396 S | 9/2014 | Talios |
| D715,870 S | 10/2014 | Talios |
| 8,870,200 B2 | 10/2014 | Chen |
| D717,881 S | 11/2014 | Radtke et al. |
| 8,925,935 B2 | 1/2015 | Powers et al. |
| 8,985,602 B2 | 3/2015 | Chan |
| D727,833 S | 4/2015 | Talios et al. |
| 9,027,690 B2 | 5/2015 | Chavand |
| 9,045,189 B2 | 6/2015 | Lovley, II et al. |
| 9,056,241 B2 | 6/2015 | Green |
| D736,324 S | 8/2015 | Lu et al. |
| 9,114,821 B1 | 8/2015 | Xu |
| D738,435 S | 9/2015 | O'Connell |
| D741,969 S | 10/2015 | Green |
| D748,738 S | 2/2016 | Hadley et al. |
| D750,180 S | 2/2016 | Edlauer |
| 9,321,504 B2 | 4/2016 | Hadley et al. |
| D755,899 S | 5/2016 | Castrucci et al. |
| D756,464 S | 5/2016 | Edlauer |
| D756,465 S | 5/2016 | Byrne et al. |
| 9,339,720 B2 | 5/2016 | Kortschot |
| D764,615 S | 8/2016 | Treadway et al. |
| 9,452,345 B2 | 9/2016 | Doerksen et al. |
| D772,990 S | 11/2016 | Allais |
| D774,145 S | 12/2016 | Hadley et al. |
| D774,601 S | 12/2016 | Mizrahi et al. |
| D777,844 S | 1/2017 | Connell |
| D778,806 S | 2/2017 | Welford |
| 9,592,876 B2 | 3/2017 | Lovley, II et al. |
| 9,616,318 B2 | 4/2017 | Rogers |
| 9,630,085 B2 | 4/2017 | Treadway et al. |
| 9,660,500 B2 | 5/2017 | Huang |
| 9,682,309 B2 | 6/2017 | Huang |
| 9,764,218 B2 | 9/2017 | Treadway et al. |
| 9,808,705 B2 | 11/2017 | Treadway et al. |
| D806,176 S | 12/2017 | Peng |
| D810,623 S | 2/2018 | Adcock |
| D810,836 S | 2/2018 | Hadley |
| D811,489 S | 2/2018 | Hadley et al. |
| 9,919,200 B2 | 3/2018 | Mo |
| D815,215 S | 4/2018 | Desberg |
| 9,950,244 B1 | 4/2018 | Sargis |
| D817,228 S | 5/2018 | Kroll et al. |
| D818,541 S | 5/2018 | Huang |
| 9,956,473 B2 | 5/2018 | Chiu |
| 9,987,547 B2 | 6/2018 | Ruschkowski |
| D824,805 S | 8/2018 | Karka |
| 10,071,303 B2 | 9/2018 | Pikulski |
| D829,826 S | 10/2018 | Liu et al. |
| D830,468 S | 10/2018 | Liu |
| 10,099,745 B2 | 10/2018 | Hadley et al. |
| D834,097 S | 11/2018 | Lin et al. |
| 10,124,851 B2 | 11/2018 | Lovley, II et al. |
| 10,137,356 B2 | 11/2018 | Kortschot |
| D836,727 S | 12/2018 | Wilson et al. |
| 10,144,480 B2 | 12/2018 | Tan et al. |
| D837,303 S | 1/2019 | Desberg |
| D839,358 S | 1/2019 | Cao |
| D839,359 S | 1/2019 | Hadley |
| 10,189,533 B2 | 1/2019 | Lovley, II et al. |
| D842,409 S | 3/2019 | Novick |
| D842,758 S | 3/2019 | Hall et al. |
| D849,153 S | 5/2019 | Zhang et al. |
| D849,601 S | 5/2019 | Li et al. |
| D855,115 S | 7/2019 | Yan |
| D858,646 S | 9/2019 | Yang |
| D861,538 S | 10/2019 | Frahm |
| D866,675 S | 11/2019 | Desberg |
| D872,192 S | 1/2020 | Hadley |

(56) References Cited

U.S. PATENT DOCUMENTS

| | | |
|---|---|---|
| D873,349 S | 1/2020 | Huang |
| 10,737,743 B2 | 8/2020 | Hadley et al. |
| D901,595 S | 11/2020 | Chen |
| D905,794 S | 12/2020 | Liu et al. |
| D910,121 S | 2/2021 | Liu et al. |
| D910,766 S | 2/2021 | Hadley |
| D911,455 S | 2/2021 | Huang |
| D912,180 S | 3/2021 | Desberg et al. |
| D914,102 S | 3/2021 | Hadley et al. |
| 10,933,299 B2 | 3/2021 | Zhang et al. |
| D916,985 S | 4/2021 | Wu et al. |
| D921,765 S | 6/2021 | Ostergaard |
| D923,715 S | 6/2021 | Wang et al. |
| 11,033,799 B2 | 6/2021 | Kortschot |
| 11,038,235 B2 * | 6/2021 | Ye |
| 11,084,550 B2 | 8/2021 | Aguilar Ruelas et al. |
| D936,151 S | 11/2021 | Lisle et al. |
| D936,152 S | 11/2021 | Yao et al. |
| D936,750 S | 11/2021 | Wu et al. |
| D940,251 S | 1/2022 | Wang et al. |
| D941,928 S | 1/2022 | Hadley |
| D941,929 S | 1/2022 | Hadley |
| D941,930 S | 1/2022 | Hadley |
| D949,748 S | 4/2022 | Lu |
| 11,305,830 B2 * | 4/2022 | Bartolotta |
| 11,338,883 B2 | 5/2022 | Hadley et al. |
| D957,532 S | 7/2022 | Wang et al. |
| D958,257 S | 7/2022 | Cai et al. |
| D964,473 S | 9/2022 | Lu |
| D972,040 S | 12/2022 | Lisle et al. |
| D976,333 S | 1/2023 | Chen et al. |
| D977,018 S | 1/2023 | Lu |
| 11,565,169 B2 | 1/2023 | Kortschot |
| D977,602 S | 2/2023 | Desberg et al. |
| 11,697,469 B2 | 7/2023 | Desberg et al. |
| 11,707,666 B2 | 7/2023 | Zhang et al. |
| D995,651 S | 8/2023 | Hadley |
| D995,652 S | 8/2023 | Huang |
| D1,010,013 S | 1/2024 | Hadley |
| 2001/0030405 A1 | 10/2001 | Wu et al. |
| 2002/0005309 A1 | 1/2002 | Patmont et al. |
| 2002/0066610 A1* | 6/2002 | Tsai |
| 2002/0067014 A1 | 6/2002 | Heringer et al. |
| 2002/0074756 A1 | 6/2002 | Tsai |
| 2002/0079662 A1 | 6/2002 | Lee |
| 2002/0079855 A1 | 6/2002 | Parks |
| 2002/0093161 A1 | 7/2002 | Udwin et al. |
| 2002/0096843 A1 | 7/2002 | Wei |
| 2002/0096850 A1 | 7/2002 | Lu |
| 2002/0105152 A1 | 8/2002 | Miller |
| 2002/0108798 A1 | 8/2002 | Huntsberger et al. |
| 2002/0109313 A1 | 8/2002 | Johnsen |
| 2002/0117825 A1 | 8/2002 | Ho |
| 2002/0134604 A1 | 9/2002 | Lan |
| 2002/0140194 A1 | 10/2002 | Shaw |
| 2002/0145264 A1 | 10/2002 | Hung |
| 2002/0149165 A1 | 10/2002 | Lin |
| 2002/0158437 A1 | 10/2002 | Carbonero |
| 2002/0167146 A1 | 11/2002 | Chang |
| 2002/0170763 A1 | 11/2002 | Townsend |
| 2002/0180169 A1 | 12/2002 | Kwok |
| 2003/0020244 A1 | 1/2003 | Sung |
| 2003/0042058 A1 | 3/2003 | Chen |
| 2003/0127816 A1 | 7/2003 | Schnuckle et al. |
| 2003/0168273 A1 | 9/2003 | Ducharme et al. |
| 2003/0221888 A1 | 12/2003 | McKinney, Jr. et al. |
| 2004/0041359 A1 | 3/2004 | Im |
| 2004/0050603 A1* | 3/2004 | Jaeger |
| 2004/0129472 A1 | 7/2004 | Cheng |
| 2004/0217562 A1 | 11/2004 | Haugen et al. |
| 2005/0006859 A1 | 1/2005 | Farrelly et al. |
| 2005/0006866 A1 | 1/2005 | Chen |
| 2005/0012289 A1 | 1/2005 | Wang et al. |
| 2005/0012290 A1 | 1/2005 | McClain |
| 2005/0116430 A1 | 6/2005 | Chen |
| 2005/0121866 A1 | 6/2005 | Kamen et al. |
| 2005/0127629 A1 | 6/2005 | Nelson et al. |
| 2005/0173175 A1 | 8/2005 | Lee |
| 2005/0194759 A1 | 9/2005 | Chen |
| 2006/0049595 A1 | 3/2006 | Crigler et al. |
| 2006/0125200 A1 | 6/2006 | Cole |
| 2006/0279055 A1 | 12/2006 | Morabito |
| 2007/0045976 A1 | 3/2007 | Wu |
| 2007/0126191 A1 | 6/2007 | Kay, III |
| 2008/0197594 A1 | 8/2008 | Ling |
| 2008/0203691 A1 | 8/2008 | Hsu |
| 2009/0071740 A1 | 3/2009 | Palmer |
| 2009/0160150 A1 | 6/2009 | Johnson |
| 2009/0200768 A1 | 8/2009 | Armand et al. |
| 2009/0273152 A1 | 11/2009 | Chung |
| 2009/0321193 A1 | 12/2009 | Jackman et al. |
| 2010/0090422 A1 | 4/2010 | Chan et al. |
| 2010/0123295 A1 | 5/2010 | Landau |
| 2010/0133765 A1 | 6/2010 | Chen |
| 2011/0011657 A1 | 1/2011 | Donnell et al. |
| 2011/0031711 A1 | 2/2011 | Grossman |
| 2011/0056177 A1 | 3/2011 | Goto |
| 2012/0086181 A1 | 4/2012 | Kinnaman |
| 2013/0026734 A1 | 1/2013 | Zhang et al. |
| 2013/0081891 A1 | 4/2013 | Ulmen et al. |
| 2013/0087983 A1 | 4/2013 | Ngai |
| 2013/0186698 A1 | 7/2013 | Sarokhan |
| 2013/0270016 A1 | 10/2013 | Donnell et al. |
| 2013/0282216 A1 | 10/2013 | Edney |
| 2013/0320648 A1 | 12/2013 | Eckert et al. |
| 2014/0090916 A1 | 4/2014 | Lovely, II et al. |
| 2014/0158446 A1 | 6/2014 | Treadway |
| 2014/0332297 A1 | 11/2014 | Kortschot |
| 2015/0196831 A1 | 7/2015 | Treadway et al. |
| 2015/0306511 A1 | 10/2015 | Norman et al. |
| 2015/0352430 A1 | 12/2015 | Treadway et al. |
| 2016/0129963 A1 | 5/2016 | Ying et al. |
| 2016/0213999 A1 | 7/2016 | Treadway et al. |
| 2016/0256767 A1 | 9/2016 | Cerboneschi |
| 2016/0311322 A1 | 10/2016 | Lagant et al. |
| 2017/0182397 A1 | 6/2017 | Zhang |
| 2017/0182398 A1 | 6/2017 | Garcia Elena |
| 2017/0240239 A1 | 8/2017 | Huang et al. |
| 2017/0259162 A1 | 9/2017 | Mo |
| 2018/0015355 A1 | 1/2018 | Desberg et al. |
| 2018/0029659 A1 | 2/2018 | Desberg |
| 2019/0084605 A1 | 3/2019 | Berendzen et al. |
| 2019/0263468 A1 | 8/2019 | Huang |
| 2019/0367116 A1 | 12/2019 | Desberg et al. |
| 2020/0307735 A1 | 10/2020 | Paris et al. |
| 2021/0236910 A1 | 8/2021 | Behrmann |
| 2022/0006959 A1 | 1/2022 | Chen et al. |
| 2022/0041243 A1 | 2/2022 | Qiao |
| 2022/0048402 A1 | 2/2022 | Desberg et al. |
| 2022/0118344 A1 | 4/2022 | Kortschot |
| 2022/0204112 A1 | 6/2022 | Sun et al. |
| 2022/0348284 A1 | 11/2022 | Hadley et al. |
| 2023/0127757 A1 | 4/2023 | Lovley, II et al. |
| 2023/0415024 A1 | 12/2023 | Kortschot |
| 2024/0010291 A1 | 1/2024 | Desberg et al. |

FOREIGN PATENT DOCUMENTS

| | | |
|---|---|---|
| CN | 2273210 Y | 1/1998 |
| CN | 2436196 Y | 6/2001 |
| CN | 2448414 Y | 9/2001 |
| CN | 2449767 Y | 9/2001 |
| CN | 2452873 Y | 10/2001 |
| CN | 1143702 C | 3/2004 |
| CN | 2619503 Y | 6/2004 |
| CN | 2717494 Y | 8/2005 |
| CN | 2785659 Y | 6/2006 |
| CN | 2915189 Y | 6/2007 |
| CN | 200966900 Y | 10/2007 |
| CN | 204021174 U | 12/2014 |
| CN | 104787183 | 7/2015 |
| CN | 104941171 A | 9/2015 |
| CN | 105148496 A | 12/2015 |
| CN | 303684781 | 5/2016 |

(56) References Cited

FOREIGN PATENT DOCUMENTS

| | | | |
|---|---|---|---|
| CN | 106422285 A | 2/2017 |
| CN | 205952205 | 2/2017 |
| CN | 205952219 U | 2/2017 |
| CN | 206138715 U | 5/2017 |
| CN | 108295457 A | 7/2018 |
| CN | 108325204 A | 7/2018 |
| CN | 304753393 | 7/2018 |
| CN | 109927829 | 6/2019 |
| CN | 109927829 A | * | 6/2019 |
| CN | 305407387 | 10/2019 |
| CN | 110979533 A | 4/2020 |
| CN | 210258685 U | 4/2020 |
| CN | 210618344 U | 5/2020 |
| CN | 3058861136 | 6/2020 |
| CN | 111703528 A | 9/2020 |
| DE | 4424297 A1 | 1/1996 |
| DE | 201 07 388 U1 | 7/2001 |
| EP | 0 995 468 | 4/2000 |
| GB | 2 441 394 | 9/2008 |
| GB | 9007711890-0001 | 2/2020 |
| GB | 8210638000-1000 | 4/2020 |
| JP | 56085381 | 7/1981 |
| JP | 2001-225775 A | 8/2001 |
| JP | 3081197 U | 10/2001 |
| KR | 200378761 Y1 | 3/2005 |
| SU | 912584 A1 | 3/1982 |
| WO | WO 96/20762 | 7/1996 |
| WO | WO 2000/03773 | 1/2000 |
| WO | WO 2002/089933 | 11/2002 |
| WO | WO 2008/006275 | 1/2008 |
| WO | WO 2008/019482 | 2/2008 |
| WO | WO 2015/095368 | 6/2015 |
| WO | WO 2015/114614 A2 | 8/2015 |
| WO | WO 2016/128488 | 8/2016 |
| WO | WO 2017/050247 | 3/2017 |
| WO | WO 2017/127464 A1 | 7/2017 |
| WO | WO 2018/013994 | 1/2018 |
| WO | WO 2018/019156 A1 | 2/2018 |
| WO | WO 2019/0232248 | 12/2019 |
| WO | WO 2020/069299 A1 | 4/2020 |
| WO | WO 2021/073422 A1 | 4/2021 |
| WO | WO 2022/032136 | 2/2022 |

OTHER PUBLICATIONS

International Search Report and Written Opinion in corresponding International Patent Application No. PCT/US2021/045006, dated Oct. 28, 2021, in 22 pages.
https://www.amazon.com/Razor-Turbo-Jetts-Electric-Wheels/dp/BK07H6RB4MX?th=1, 2018.
Razor Jetts Heel Wheels, Purple, One Size, https://www.amazon.ca/Razor-Jetts-Heel-wheels-purple/dp/B073XQJZSX/, Jul. 14, 2017, in 1 page.
Kids Roller Skates—Heel Wheel Roller Skates Attachable Shoe, https://www.amazon.ca/Kids-Roller-Skates-Attachable-Trainer/dp/B08R21VVDJ/, Dec. 19, 2020, in 1 page.
Amy Tucker, "We tried both Calgary e-scooter brands Lime and Bird—here's how they compare," Jul. 30, 2019, the star.com, site visited Jan. 23, 2023, https://www.thestar.com/calgary/2019/07/29/we-tried-both-calgary-e-scooter-brands-lime-and-bird-heres-how-they-compare.html, in 3 pages.
"Razor Electric Hub Motor Scooter Owner's Manual (Kobalt)," Aug. 12, 2020, data2.manualslib.com, site visited Jan. 23, 2023, https://data2.manualslib.com/pdf7/209/20836/20836/2083509-razor/kobalt.pdf?edd92ca8adaa31a5bed07f3ecd24e2e5, in 4 pages.
"Razor Worldwide," Nov. 11, 2019, facebook.com, site visited Jan. 23, 2023, https://www.facebook.com/RazorWorldwide/photos/2558446474245901, in 1 page.
Tim Nelson and Elizabeth Dunbar, "Electric scooter rentals debut in Twin Cities; Mpls. Eyes regulation," Jul. 10, 2018, mprnews.org, site visited Jan. 23, 2023, https://www.mprnews.org/story/2018/07/10/electric-scooter-rentals-debut-twin-cities-hours-before-mpls-vote, in 1 page.
"Xiaomi M365/PRO/PRO2/1S/3 any voltage hot swappable extra battery," Jun. 8, 2020, youtube.com, site visited Jan. 23, 2023, https://www.youtube.com/watch?v=1cJFdFCtMGI, in 1 page.
"Zag Daily," Aug. 25, 2020, twitter.com, suite visited Jan. 23, 2023, https://mobile.twitter.com/ZagDaily/status/1298193918660694017/photo/1, in 1 page.

* cited by examiner

ELECTRIC SCOOTER WITH REMOVABLE BATTERY

CROSS REFERENCE

This application claims the benefit under 35 U.S.C. § 119 of U.S. Provisional Patent Application No. 63/062,838, filed Aug. 7, 2020, the entirety of which is incorporated by reference herein.

BACKGROUND

Field

This disclosure relates generally to motorized scooters, such as scooters with electric motors that are powered by readily removable batteries.

Description of Certain Related Art

Personal mobility vehicles, such as scooters and wheeled boards, have become popular recreational products, as well as useful transportation devices. Scooters and wheeled boards typically have at least two wheels and a steering mechanism. Some scooters and wheeled boards include motors powered by batteries or other power sources.

SUMMARY OF CERTAIN FEATURES

A need still exists for new and/or improved designs, which may provide a new riding experience or unique functionality. The systems, methods, vehicles, and devices described herein have innovative aspects, no single one of which is indispensable or solely responsible for their desirable attributes.

Various personal mobility vehicles and powered mobility systems are described in this disclosure.

In a first broad aspect, an electric scooter is provided, including a front wheel, a rear wheel, a motor operably coupled to the rear wheel and configured to drive the rear wheel, a handlebar assembly including a handlebar and a shaft, the shaft rotatable with respect to the body, the front wheel rotationally coupled to the shaft, a body including a support surface configured to support a user and a strut extending between the support surface and the rotatable shaft, and a battery receptacle configured to receive and releasably retain a removable battery configured to power the motor, wherein the battery receptacle is supported by the strut.

The battery receptacle can be oriented to receive the removable battery in a direction generally parallel to a longitudinal axis of the strut. The battery receptacle can be located over an upper surface of the strut. The battery receptacle can be configured to make a latching connection with the removable battery.

At least one of the battery receptacle and the removable battery can include a biased retention structure configured to allow insertion of the removable battery into the battery receptacle while inhibiting removal of the removable battery from the battery receptacle. The battery receptacle can be located forward of the support surface of the body. A dimension of the battery receptacle in a direction parallel to a longitudinal axis of the strut can be less than a distance between the battery receptacle and the rotatable shaft.

In another broad aspect, an electric scooter is provided, including a front wheel rotationally coupled to a rotatable shaft and a handlebar assembly, a rear wheel coupled to a driving motor configured to drive the rear wheel, a scooter body including a deck configured to support a rider thereon and a strut extending between the deck and the deck and a main tube configured to retain the rotatable shaft, and a battery releasably connected to the scooter body and configured to power the driving motor, the battery positioned between at least a portion of the front wheel and at least a portion of the rear wheel, and at least a portion of the battery being vertically above the deck.

The entire battery can be positioned vertically above the deck. The battery can include a release button configure to permit detachment of the battery from the scooter body when the release button is pressed. The electric scooter can include a throttle assembly configured to control the speed of the electric scooter by adjusting the speed of the driving motor. The throttle assembly can include a thumb-actuated accelerator supported by the handlebar assembly.

The strut can be oriented at an oblique angle to the deck, and the battery can be supported by the strut. The strut can support a housing defining a battery receptacle, and the battery can be releasably inserted in the battery receptacle. The battery receptacle can be located in an upper surface of the body.

In another broad aspect, a method of using a battery is provided, the method including operating an electric scooter including a plurality of wheels, the plurality of wheels including a driven wheel operationally coupled to a driving motor, wherein operating the electric scooter includes inserting the battery into a battery receptacle configured to releasably retain the battery therein, the battery receptacle supported by a body of the electric scooter, the retained battery being placed in selective electrical communication with the driving motor, and actuating a throttle assembly to cause power to be provided to the driving motor from the battery releasably retained in the battery receptacle, thereby driving the electric scooter, removing the battery from the battery receptacle of the scooter, and operating an electric power tool including a driving motor, a battery receptacle, a throttle assembly, and a driven tool, wherein operating the electric power tool includes inserting the battery into a battery receptacle of the power tool the retained battery being placed in selective electrical communication with the driving motor of the power tool, and actuating the throttle assembly of the power tool to cause power to be provided to the driving motor of the power tool from the battery releasably retained in the battery receptacle of the power tool, thereby driving the driven tool.

The body can include a deck configured to support a rider thereon, and a strut located forward of the deck and oriented at an angle to the deck. The battery receptacle can be supported by the strut. Inserting the battery into the battery receptacle can include translating the battery in a direction substantially parallel to a longitudinal axis of the strut. The method can further include, while a release mechanism of the battery is engaged, removing the battery from the battery receptacle.

DETAILED DESCRIPTION OF CERTAIN EMBODIMENTS

Embodiments of systems, components and methods of assembly and manufacture will now be described with reference to the accompanying figures, wherein like numerals refer to like or similar elements throughout. Although several embodiments, examples, and illustrations are disclosed below, the inventions described herein extend beyond the specifically disclosed embodiments, examples and illustrations, and can include other uses of the inventions and obvious modifications and equivalents thereof. Although certain embodiments are disclosed in the context of a scooter, due to particular utility in that context, the present disclosure encompasses and includes the disclosed technology being applied to other types of personal mobility vehicles too, such as skateboards, casterboards, unicycles, bicycles, tricycles, motorcycles, carts (e.g., go-carts), and other wheeled vehicles. Embodiments of the inventions can comprise several novel features and no single feature is solely responsible for its desirable attributes or is essential to practicing the inventions herein described. Throughout the following description, like numbers refer to like components.

Figure 1:
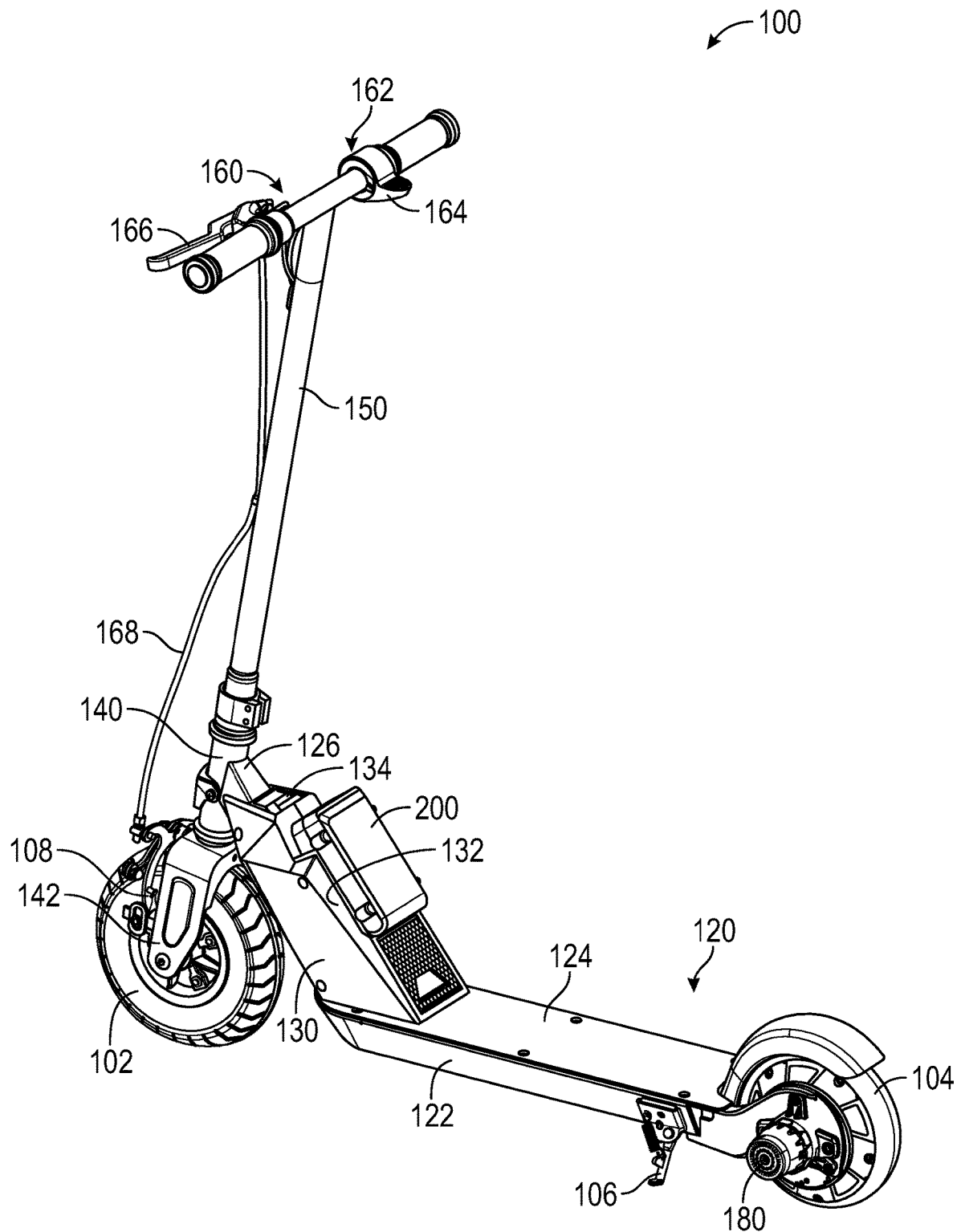
FIG. 1 is a top perspective view depicting a scooter with a removable multi-function battery.
Figure 2A:
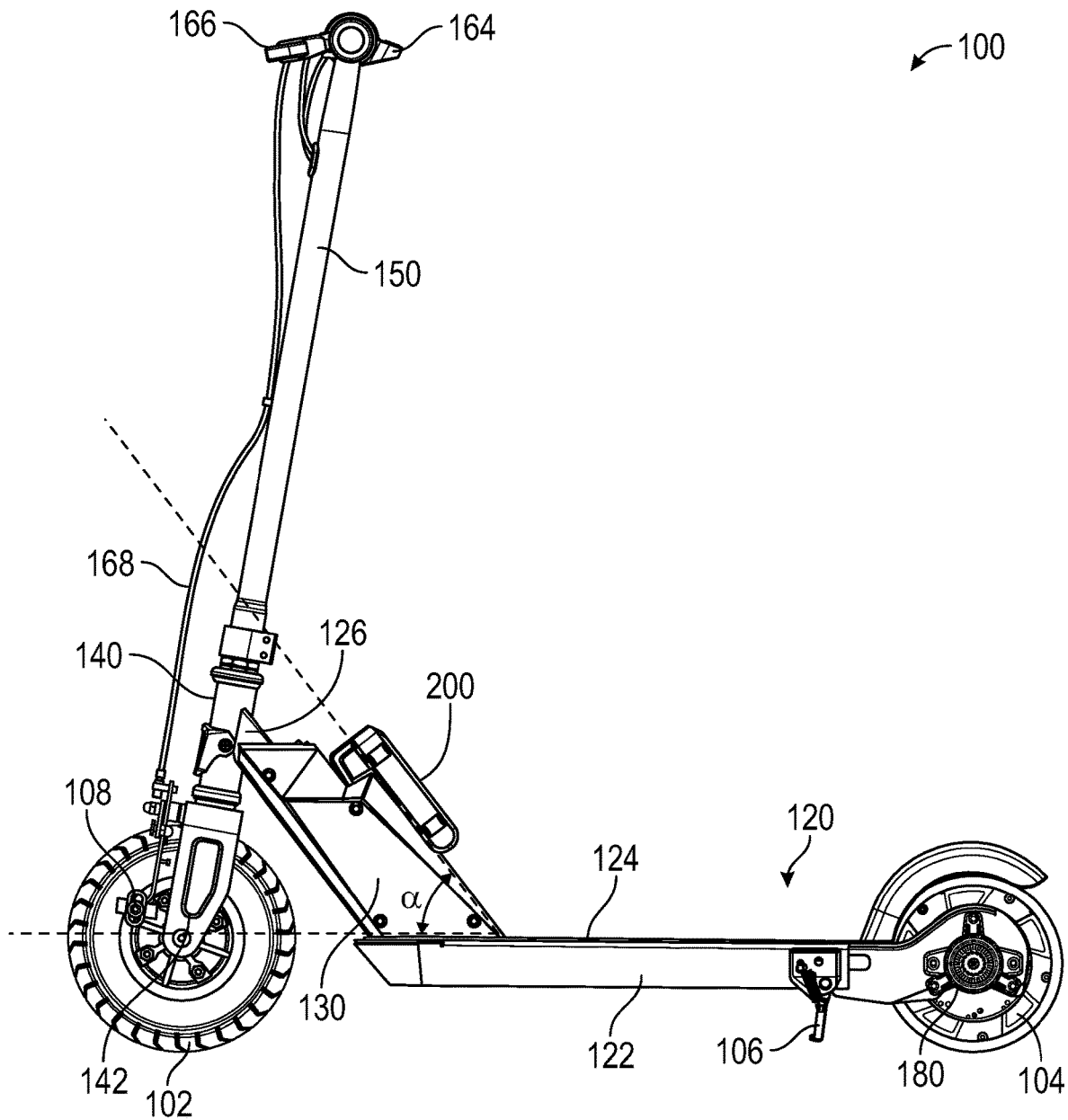
FIG. 2A is a left side view of the scooter of FIG. 1.
Figure 2B:
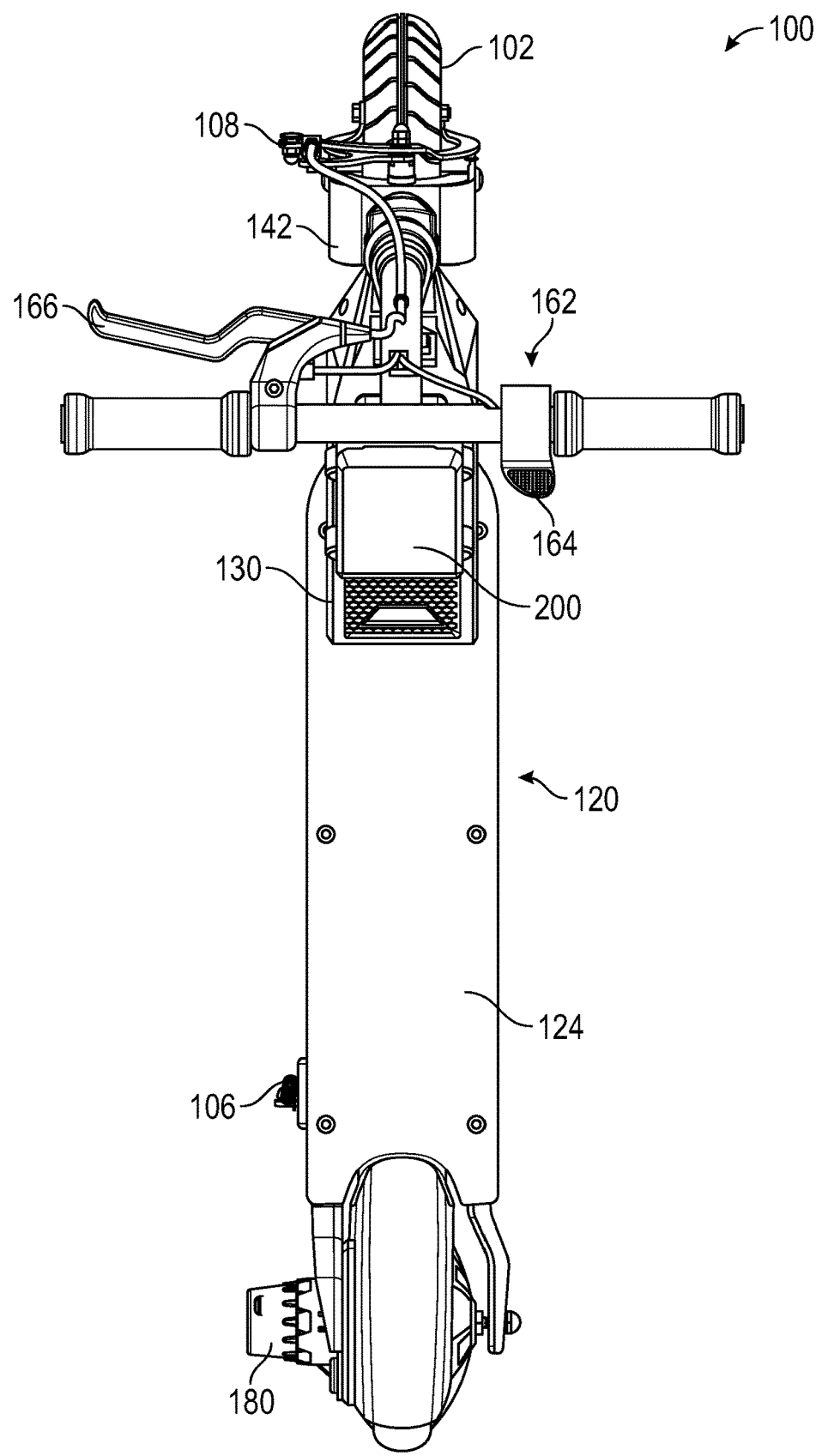
FIG. 2B is a top plan view of the scooter of FIG. 1.
Figure 2C:
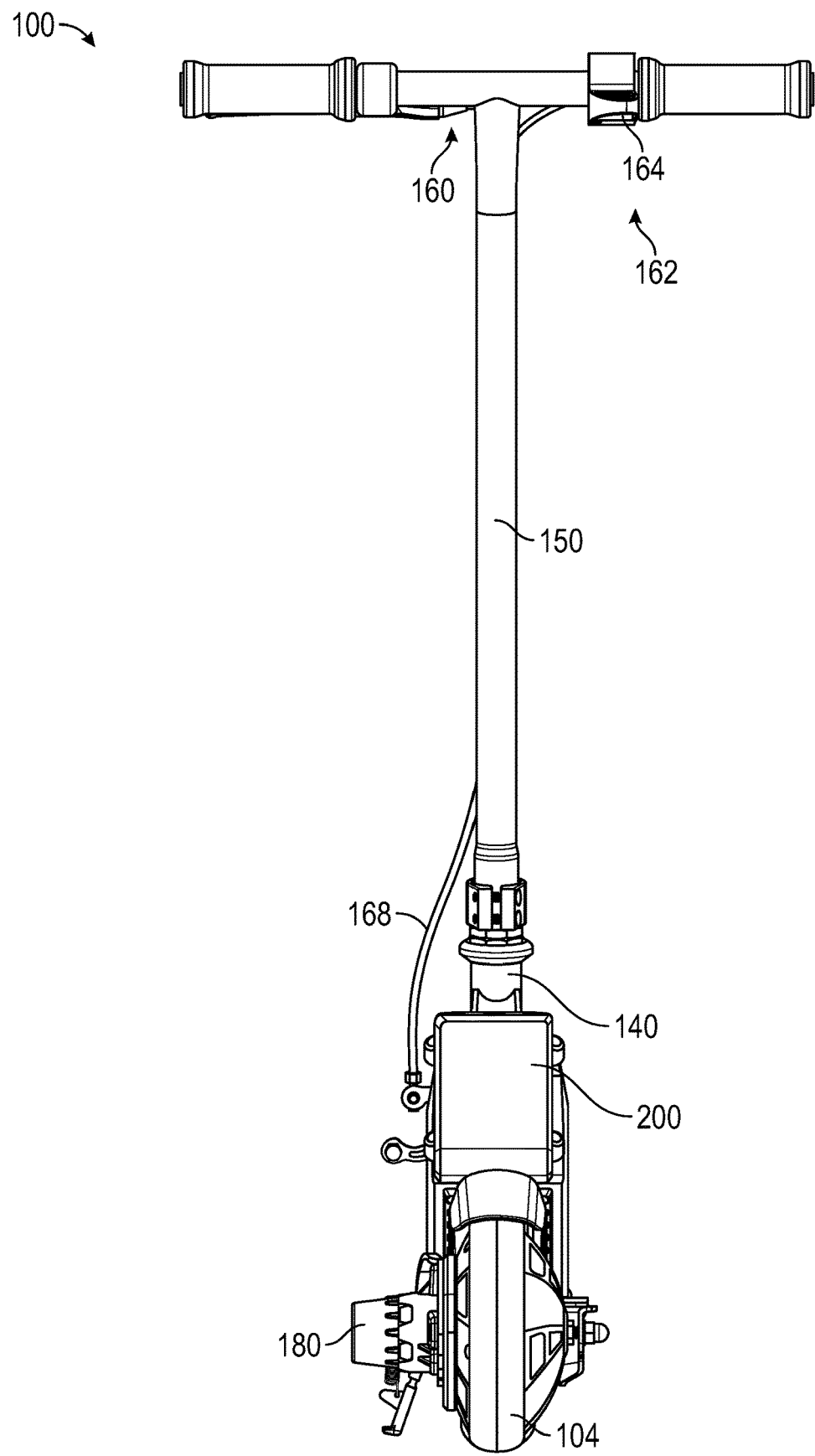
FIG. 2C is a rear view of the scooter of FIG. 1.
Figure 2D:
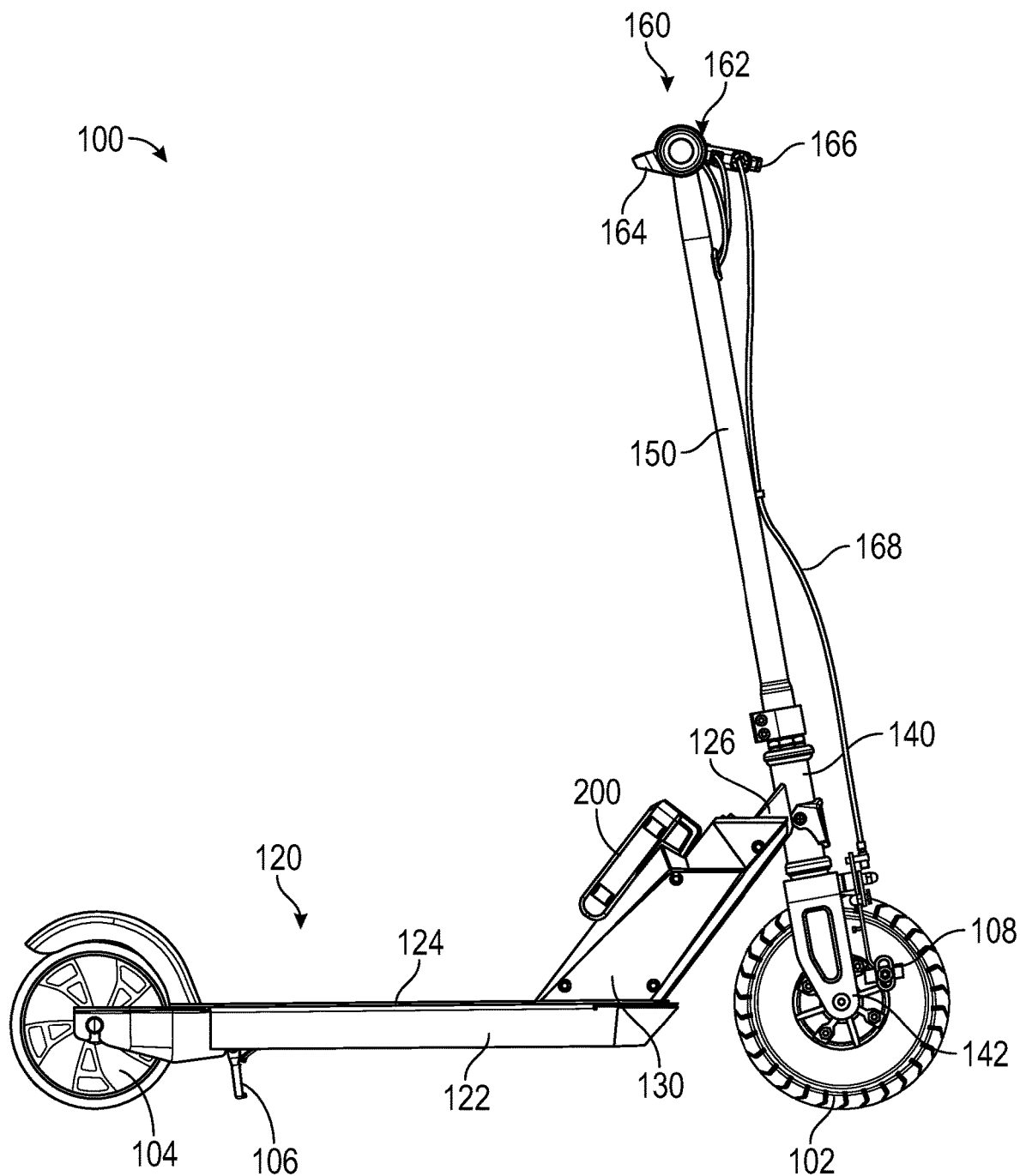
FIG. 2D is a right side view of the scooter of FIG. 1.
Figure 2E:
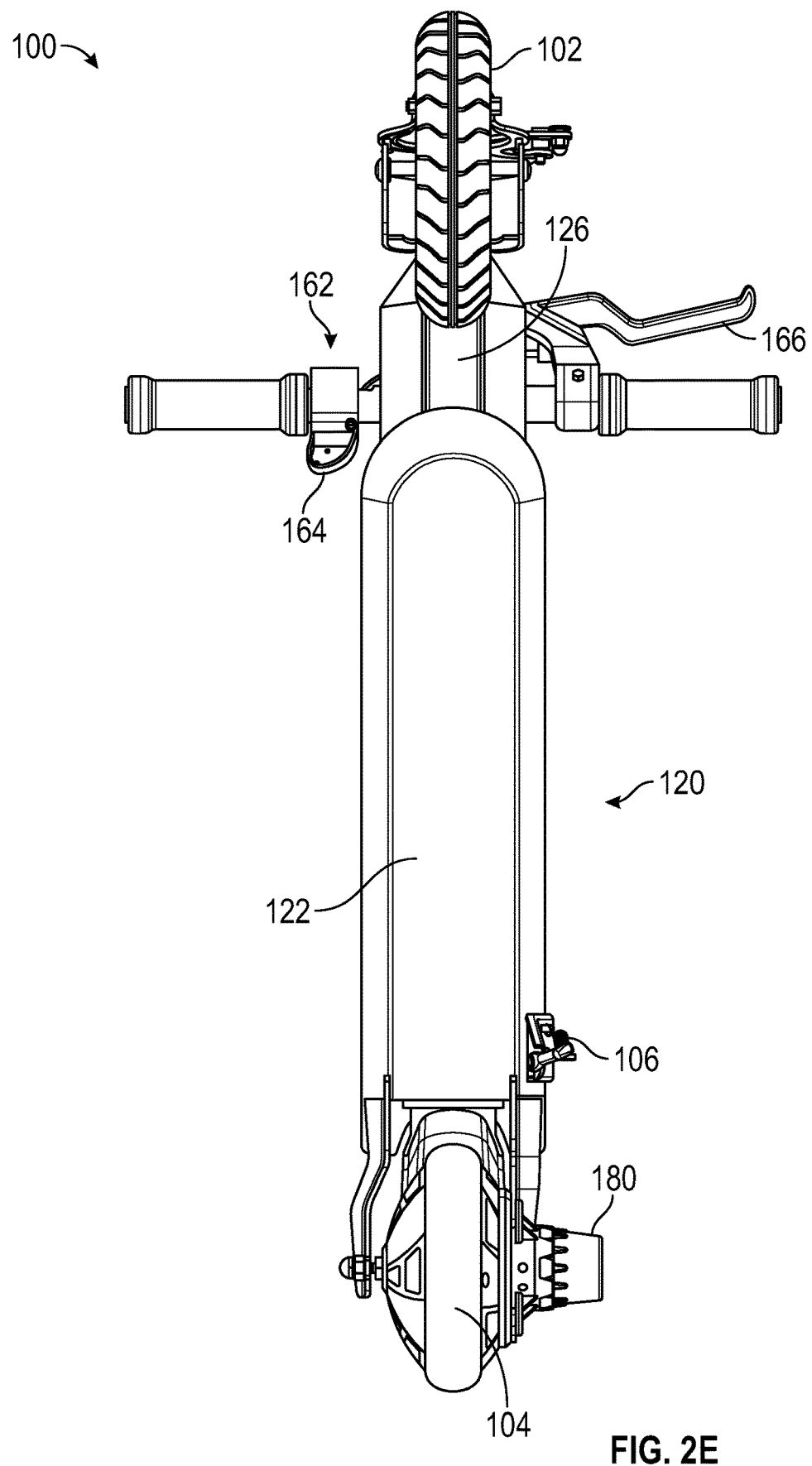
FIG. 2E is a bottom view of the scooter of FIG. 1.
Figure 2F:
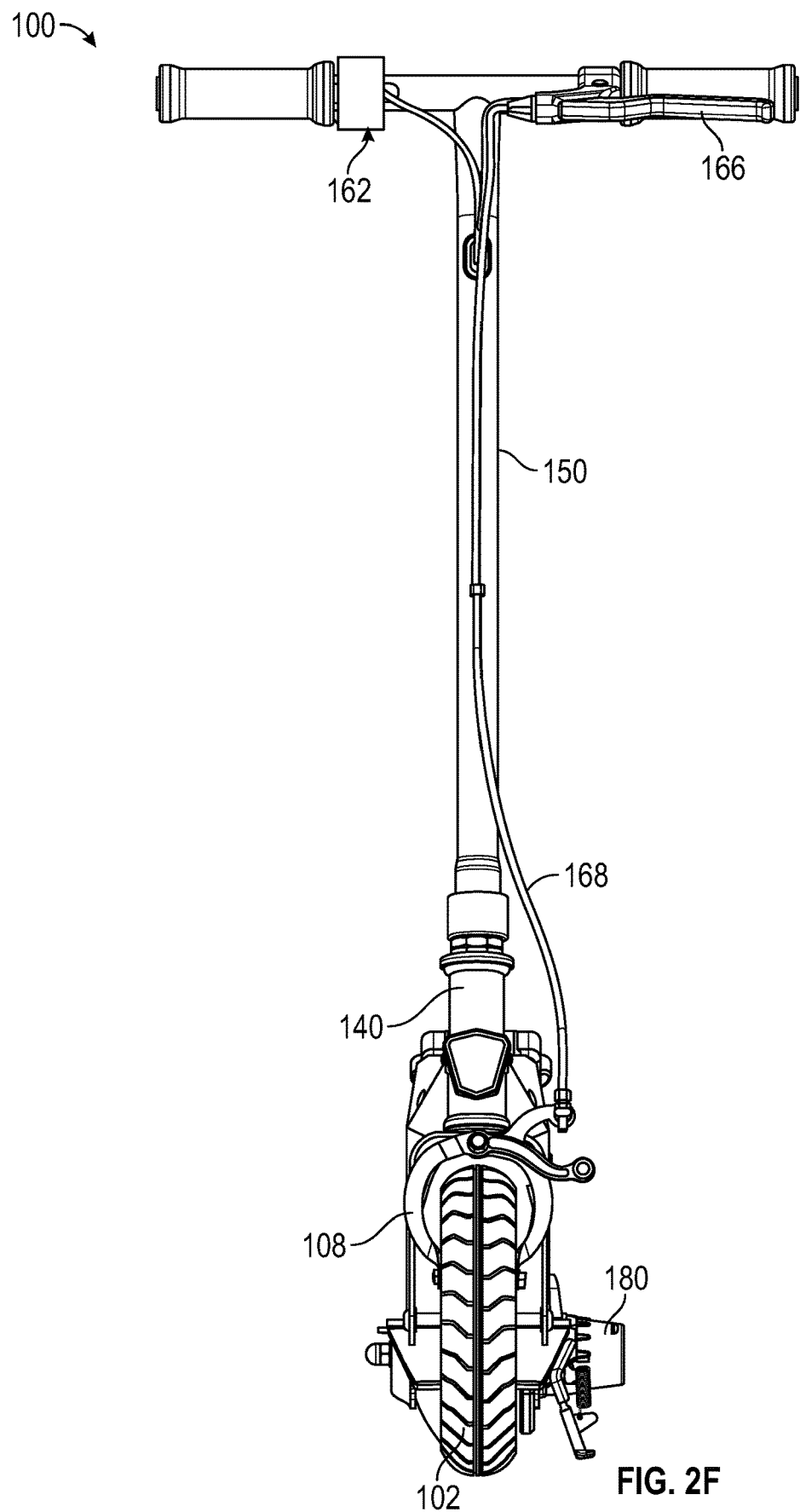
FIG. 2F is a front view of the scooter of FIG. 1.

FIG. 1 is a top perspective view depicting a scooter with a removable multi-function battery. FIG. 2A is a left side view of the scooter of FIG. 1. FIG. 2B is a top plan view of the scooter of FIG. 1. FIG. 2C is a rear view of the scooter of FIG. 1. FIG. 2D is a right side view of the scooter of FIG. 1. FIG. 2E is a bottom view of the scooter of FIG. 1. FIG. 2F is a front view of the scooter of FIG. 1.

As shown in FIG. 1, the scooter 100 includes a body 120 and a rotatable shaft 150 which can be rotated about a longitudinal axis of the rotatable shaft 150, relative to the body 120. The rotatable shaft 150 may be connected to a handlebar assembly 160 which can be rotationally fixed with respect to the rotatable shaft 150, such that the handlebar assembly 160 can be rotated to induce a corresponding rotation of the rotatable shaft 150.

In some embodiments, the scooter 100 has a plurality of wheels, including a front wheel 102 and a rear wheel 104, which can be directly or indirectly attached to the body 120 to support the body 120.

The body 120 can include a deck section 122 which can include a platform or support surface 124. The support surface 124 can be of any suitable size or shape, but may, in some embodiments, be longitudinally longer than it is wide, as illustrated in FIG. 1. The support surface 124 may be dimensioned and configured to accommodate both feet of a rider, such as in one or both of a fore-and-aft or side-by-side arrangement. In some embodiments, the deck section 122 may include ribs or other structural features which may increase the rigidity of the deck section 122, such as to minimize downward flexure of the support surface 124 when under the load of a rider. The deck section 122 may comprise a fairing or other structure on the underside of the deck section 122, which may provide space for and protection for routing of such support ribs or other structural features. In addition, a fairing may provide space for and protection of power and/or control cables which may be routed underneath the support surface 124.

A kickstand 106 may be connected to the deck section 122, and may be extendable or otherwise movable into an active position in which a portion of the kickstand 106 extends downward to contact an underlying surface and support the scooter 100 in a stable position.

In the illustrated embodiment, the deck section 122 and the support surface 124 may extend generally parallel to an underlying surface on which the scooter 100 is supported when both the front wheel 102 and the rear wheel 104 are in contact with the underlying surface. The body 120 may also include an angled strut section 126 which extends upward from a forward section of the deck section 122 and at an oblique angle to the deck section 122. The angled strut section 126 of the body 120 may provide clearance for the front wheel 102.

In various embodiments, the scooter 100 can include a battery 200, such as a lithium-ion or other type of battery. The battery 200 can be a removable and/or rechargeable battery 200. The battery 200 can include an indicator, such as one or more lights that indicate the battery's charge level. The scooter 100 can be equipped with connections for coupling mechanically and electrically with the battery 200. The connections can be configured to simultaneously provide mechanical and electrical coupling between the battery 200 and the scooter 100. The connections can be configured to enable quick attachment and detachment of the battery 200 from the scooter 100. In some embodiments, a portion or the entirety of, the battery is horizontally positioned between the front and rear wheels 102, 104 and/or vertically positioned above (e.g., at an elevation higher than) the deck section 122. In certain variants, the battery 200 is positioned forward of the rear wheel 104 and/or nearer to the front wheel 102 than to the rear wheel 104.

For example, the angled strut section 126 may include connections in the form of a housing 130 and a battery receptacle region 132. The battery receptacle region 132 may be dimensioned to receive and retain at least a portion of the removable battery 200. The battery receptacle region 132 and/or the battery 200 may be supported by (e.g., positioned on) the strut section 126. The battery 200 may be rechargeable, and may be suitable for use in other devices, such as power tools, in addition to the scooter 100. The battery receptacle region 132 may be dimensioned and located relative to the rotatable shaft 150 and other components of the scooter 100 such that the battery 200 can be inserted into and removed from the battery receptacle region 132. In some implementations, the battery 200 is inserted in a direction in which at least a component of the motion is downward and or toward a rear of the scooter and/or is the battery 200 is removed in a direction in which at least a component of the motion is upward and/or toward a front of the scooter. In the illustrated embodiment, the battery 200 is inserted and retained at an angle α relative to the plane of the support surface 124. In several embodiments, the battery 200 installed in the battery receptacle region 132 is readily visible to a person riding the scooter 100. This can beneficially allow the person to see an indicator on the battery 200, such as a charge level indicator. In some implementations, the battery 200 is visible by a rider looking down toward his or her feet. In some embodiments, a rider can see the battery 200 without needing to look rearward, which could be risky while moving forward on the scooter 100.

The scooter 100 may be adapted to allow for quickly changing the battery 200. The battery receptacle region 132 may include a quick connect system for connecting the scooter 100 to the battery 200. At least one of the battery 200 and/or the scooter 100 may have a latch connection to retain the battery 200 in place within the battery receptacle region 132, while enabling the battery 200 to be separated from the scooter 100 when the latch connection is operated. The latch connection may be opened, for example, by pushing on a button, tab, lever, or other release mechanism.

Attaching the battery to the scooter may include moving (e.g., pushing) the battery into a connected position on the scooter. In several variants, the battery 132 is translated along a portion or and/or relative to the strut portion 122. For example, in the illustrated embodiment, the battery can be located on and/or slid in a direction generally parallel to the strut section 126 that connects the horizontal deck section 122 and the generally vertical head tube 140. In some embodiments, the battery receptacle region 132 is configured such that the battery 200 may be inserted in a direction which is not parallel to the longitudinal axis of the strut portion 126, such as a direction generally perpendicular to the longitudinal axis of the strut portion 126. As shown in FIG. 2A, the battery can be at, and/or engaged (e.g., slid) into the battery receptacle region 132 at, an angle α with respect to the longitudinal axis of the deck section 122. In some embodiments, the angle α is an acute angle, such as greater than zero and less than or equal to about: 15°, 30°, 45°, 60°, 75°, or otherwise. In some implementations, the strut portion 126 is at or near the angle α relative to the longitudinal axis of the deck section 122.

The forwardmost portion of the strut section 126 connects to the head tube 140 of the scooter 100, which may be rigidly connected to or integral with the other components of the body 120. The rotatable shaft 150 may extend through the head tube 140, or be connected with another component axially aligned with the rotatable shaft 150. The head tube 140 may be oriented such that the rotatable shaft 150 is canted backwards, with the portion of the rotatable shaft located above the head tube 140 extending at a slight angle backwards over the body 120.

The rotatable shaft 150 may be connected, either directly or indirectly, with a support fork 142 located underneath the head tube 140. The support fork 142 connects with the front wheel 102, such that the handlebar assembly 160 can be rotated to swivel the front wheel 102 to steer the scooter 100. The support fork 142 can, in some embodiments, be directly connected to sides of the front wheel 102 and/or connected to an axle that extends through a rotational axis of the front wheel 102.

In some embodiments, the front wheel 102 is approximately the same size as the driving wheel or rear wheel 104. In some embodiments, the front wheel 102 can have a diameter that is greater than the driving wheel 104. In some embodiments, the front wheel 102 has a diameter that is less than the driving wheel 104. In some embodiments, the scooter 100 has two front wheels. In some embodiments, the scooter 100 has two rear wheels.

In some embodiments, the front wheel 102 and the rear wheel 104 may be of different types. In one embodiment, the front wheel 102 may be a pneumatic tire which may be inflatable. The degree of inflation may, in some embodiments, be adjustable to control the ride of the scooter 100. In one embodiment, the rear wheel 104 may be an airless tire, such as a flat-free tire. In some particular embodiments, the rear wheel 104 may comprise an abrasion-resistant tire. In other embodiments, both the front wheel 102 and the rear wheel 104 may be inflatable tires, or both the front wheel 102 and the rear wheel 104 may be airless tires.

In some embodiments, the support surface 124 can provide comfort and/or support to a rider's feet. The support surface 124 can include one or more grips adhered or otherwise secured thereto. The grips can be configured to provide friction to secure the rider's foot or feet on the support surface 124. The grips can include protrusions (e.g., ribs or otherwise) extending upwards from the support surface 124. The protrusions can extend laterally across a top surface of the support surface 124. In some embodiments, the grips are spaced apart along the top surface of the support surface 124. In some embodiments, the grips can include slots and/or cutouts in the support surface 124, or other non-planar aspects or features of the support surface 124.

In some embodiments, the scooter 100 comprises a motor 180, such as an electric motor. In the illustrated embodiment, the motor 100 comprises a hub-drive motor, mounted in the wheel hub of the rear wheel 104. The motor 100 may include a high-torque electric motor, although other types of motors may be used in other embodiments. In other embodiments, the motor 180 may be located in a wide variety of suitable locations, such as to the underside of the body 120 underneath the support surface 124, on a rear end of the support surface 124, and/or in any other location. In some embodiments, the front wheel 102 of the scooter 100 may be the driven wheel, using any suitable motor mounting location.

The motor 180 can be operably coupled to the at least one rear wheel 104 to provide powered rotational force upon the at least one rear wheel 104. In the illustrated embodiment, the removable battery 200 and the battery receptacle region 132 are located forward of the support surface 124, while the motor 180 is located rearward of the support surface 124. In other embodiments, however, the battery receptacle region 132 and motor 180 may be located or supported at different locations on the scooter 100.

In the illustrated embodiment, the handlebar assembly 160 includes a control mechanism for controlling the operation of the motor 180. In particular, the handlebar assembly 160 includes a throttle assembly 162 on the right handlebar of the handlebar assembly 160. The throttle assembly 162 includes a rotationally actuatable throttle lever 164 which may be positioned and oriented to be engaged by the thumb of a rider, providing a thumb activated accelerator. In some embodiments, a throttle assembly 162 may include one or more of a button, switch, lever, rotary actuator, or any other suitable actuator mechanism. The actuator can be available to the hand of the rider while the rider operates the scooter 100.

By toggling or otherwise actuating the throttle lever 164, the rider can cause a signal to be sent from the throttle assembly 162 to a controller of the scooter 100 to increase or decrease the speed of a motor 180, and thus increase or decrease the speed of the scooter 100. This signal may be an electrical signal sent by a wired connection, or an RF signal sent over a wireless connection with the controller. Actuation of the throttle mechanism signals for power to be provided to the electric motor 180 from the battery 200, resulting in rotational power being transferred from the electric motor 180 to the driving wheel 104.

In some embodiments, communication and power lines can extend between the thumb activated accelerator, the battery, and the motor, and may also connect such features to a controller, such as a controller disposed within frame-mounted housing 130. These communications and/or power lines can run inside and outside the structure of the scooter 100 at different locations on the scooter 100.

In the illustrated embodiment, the handlebar assembly 160 also includes a brake actuator, which in the illustrated embodiment is a handbrake lever 166 supported by the left handlebar of the handlebar assembly 160.

The handbrake lever 166 or other brake actuator can be directly connected via a brake line 168 to a caliper braking mechanism 108 adjacent the front wheel 102, such that actuation of the brake lever 166 directly actuates the braking mechanism by applying the braking action to the front wheel 102 to slow or stop the scooter 100. The brake line may include, for example, a wire and/or cable, and can extend external to the generally vertical rotatable shaft 150 of the scooter. In other embodiments, the brake lever 166 may be in wired or wireless communication with a controller, and may send a signal to the controller to cause actuation of a braking mechanism 108 controlled by the controller.

In some embodiments, other control methods may be used in addition to or in place of the throttle assembly 162 to control the motor 180 and other components of the scooter 100. For example, the scooter 100 may include a sensor in functional communication with a controller of the scooter 100. The sensor may be, for example, a pressure sensor, or any other suitable sensor which can be used to detect actions of the rider. For example, a pressure sensor can be positioned on or otherwise integrated with the support surface 124, or elsewhere on the body 120 among other possible locations on the scooter 100. A signal from the sensor can be used to control how much power is supplied to the driving wheel 104 from the battery 180.

In some embodiments, signals from a pressure sensor can be used by the controller to detect shifts of the rider. For example, the signals can indicate how far a rider is pushing and/or leaning forward, backward, and/or sideways on various portions of the scooter 100. Accordingly, depending on the portion of the scooter 100 on which the rider is pushing, the controller can adjust the motor speed of the motor 180. This can, for example, allow some embodiments to aid the rider in balancing, can compensate for weight shifts by the rider, or otherwise aid the rider in safely operating the scooter 100.

In some embodiments, signals from a sensor can be used to control the speed of the motor. In some embodiments, the sensor can be a variable input pressure sensor. For example, in some embodiments, the controller can modify the speed of the motor 180 based on the amount of pressure that the rider applies to the sensor. In some embodiments, the harder the rider steps on the sensor (e.g., the more pressure that the rider applies to the sensor), the faster the motor speed, and the softer the rider steps on the sensor (e.g., the less pressure that the rider applies to the sensor), the slower the motor speed.

In some embodiments, the scooter 100 comprises a power switch 134 or a cut-off switch. In some embodiments, the power switch 134 can be configured to turn the motor 180 on and/or to enable the motor 180 to drive the scooter 100 in response to actuation of the power switch 134. In some embodiments, the power switch 134 is configured to turn the motor 180 off in response to actuation of the power switch 134. In certain implementations, the power switch 134 is required to receive an additional input (e.g., pressure from a rider's foot) before the scooter 100 can be driven.

In some embodiments, the motor 180 may be configured to only provide driving power to the driving wheel 104 when the scooter 100 is already in motion. For example, in some embodiments, actuation of the throttle assembly 162 may only cause the motor 180 to apply power to the driving wheel when the scooter 100 is already moving at a minimum speed. Such a feature can prevent inadvertent actuation of the motor 180, and can also provide a smoother transition between rider-propelled movement and motor-assisted movement.

In some embodiments, the scooter 100 can include a display, such as an LCD, LED screen, or otherwise. The display can provide a visual indication of a characteristic of the scooter, such as battery level, speed, distance, direction, or other information. In some embodiments, the display indicates the amount of battery power remaining. The display may indicate the battery power as a digital percentage display, or as a color gradient (such as green, yellow, red), or with any other visual indicator. The display may be configured to indicate when the battery should be replaced and/or recharged, or the amount of time remaining until the battery is fully discharged. In some embodiments, the battery may comprise a primary or secondary display, or another appearance-altering feature which can be configured to provide such information.

Figure 3A:
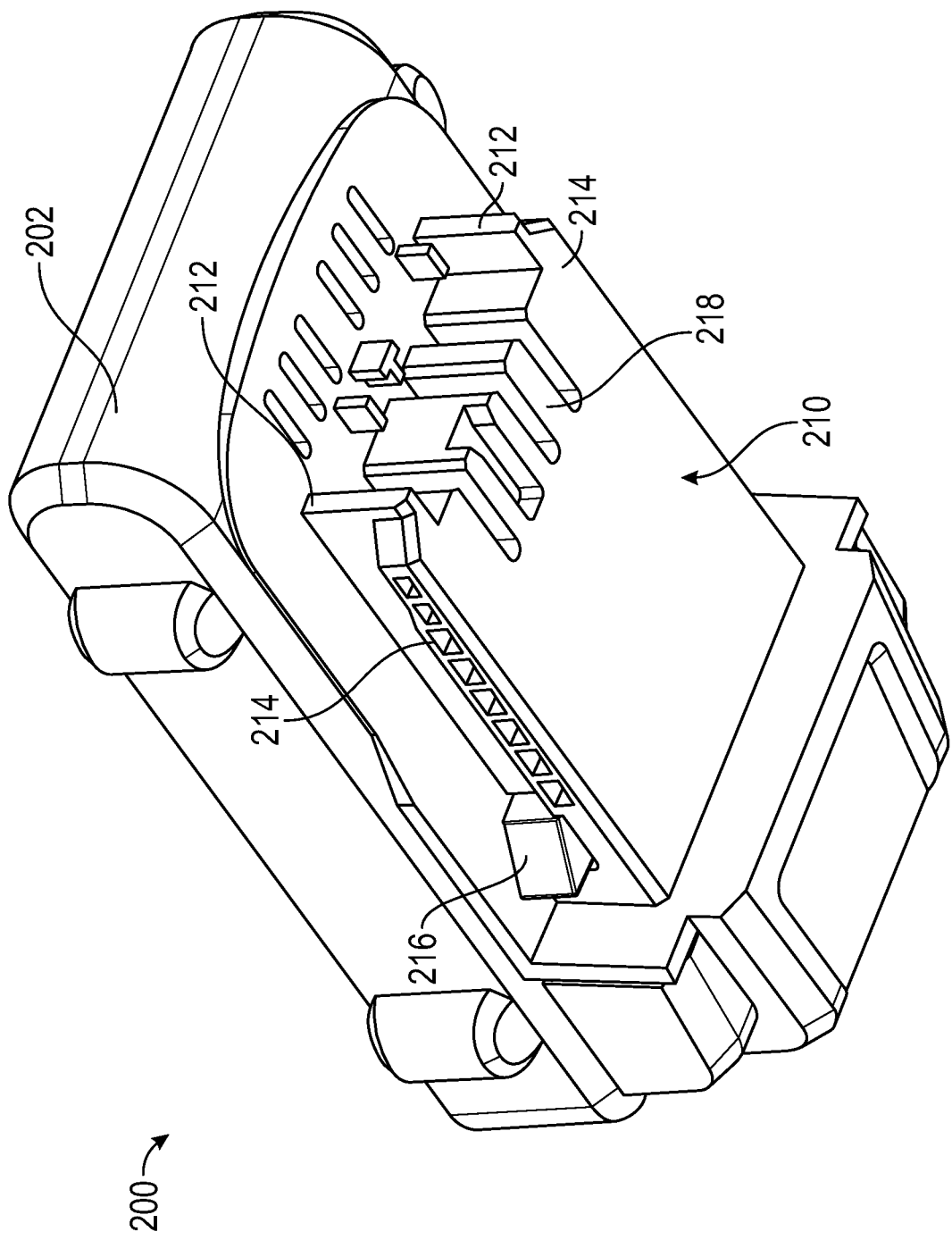
FIG. 3A is a bottom perspective view of a removable multi-function battery, such as the removable battery of the scooter of FIG. 1.
Figure 3B:
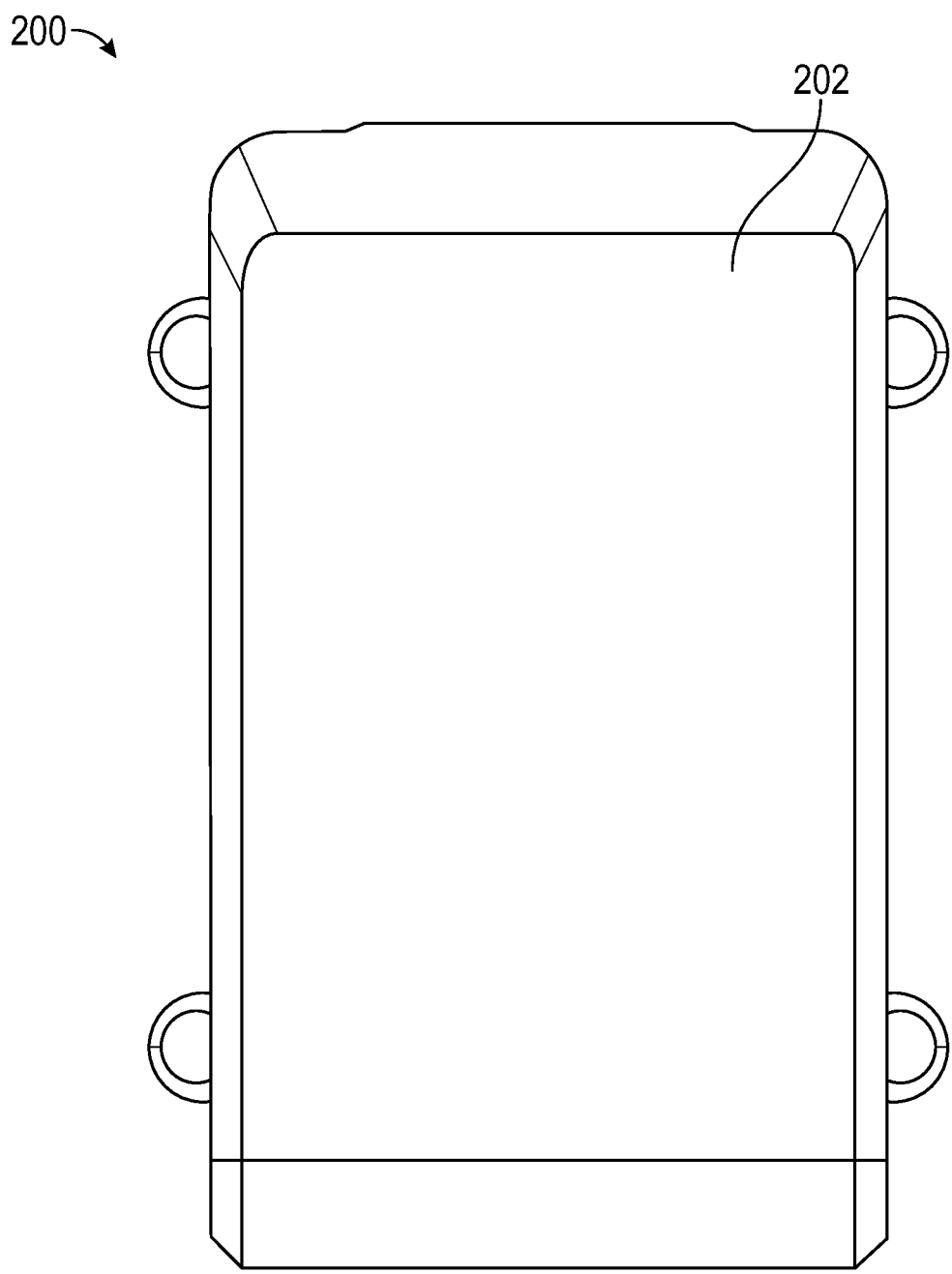
FIG. 3B is a top plan view of the battery of FIG. 3A.
Figure 3C:
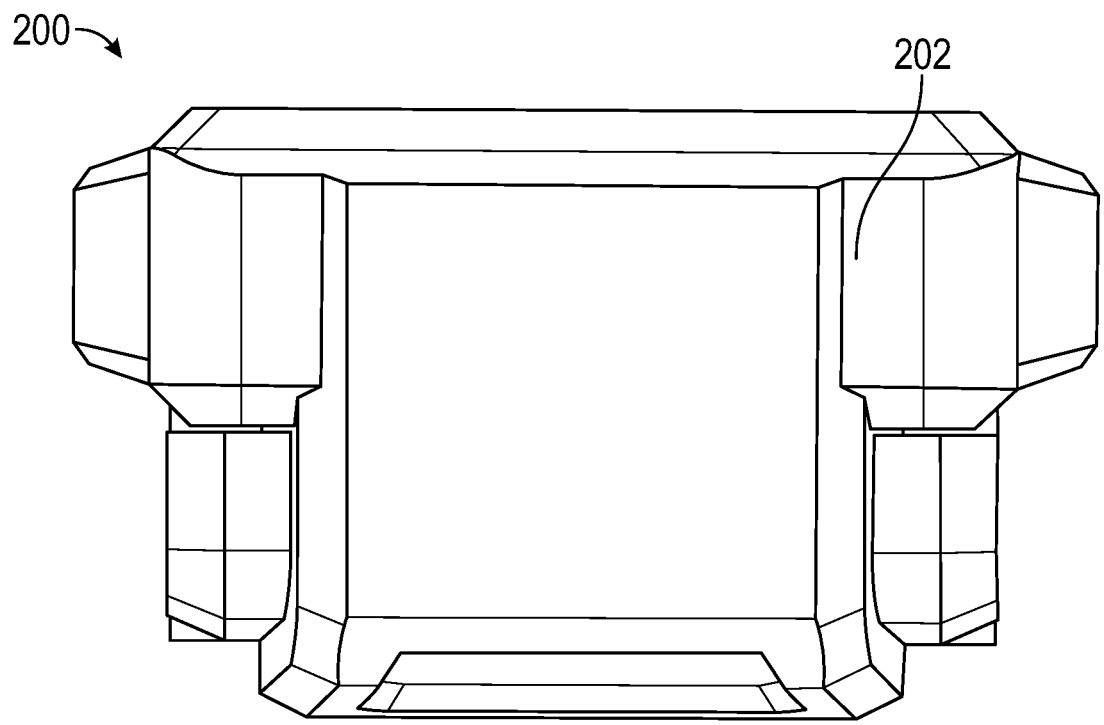
FIG. 3C is a rear view of the battery of FIG. 3A.
Figure 3D:
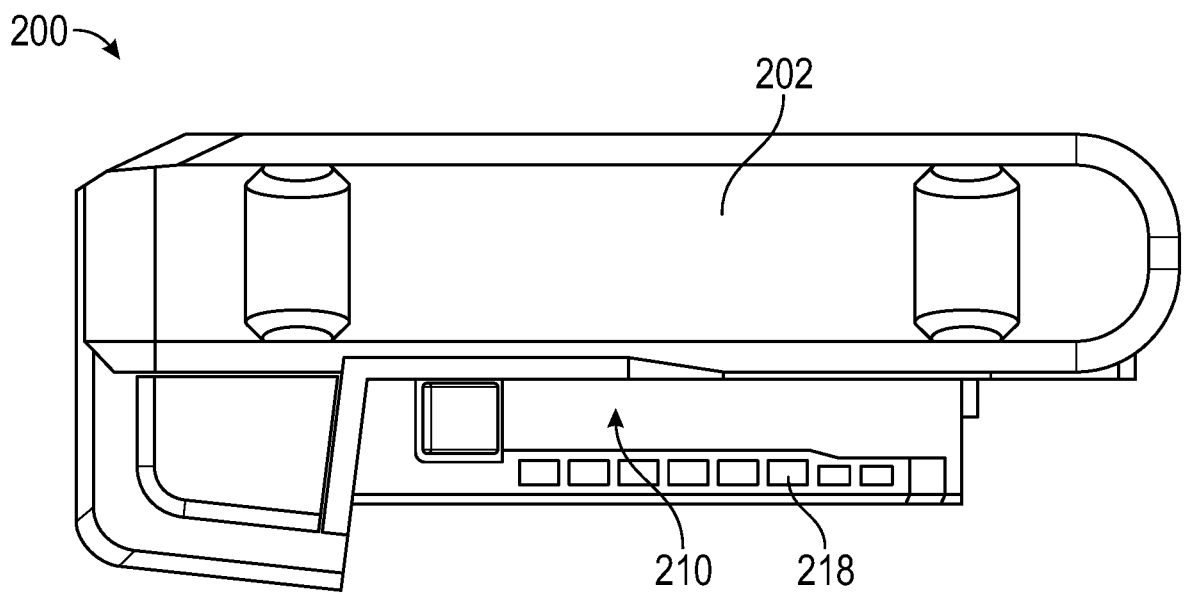
FIG. 3D is a right side view of the battery of FIG. 3A.
Figure 3E:
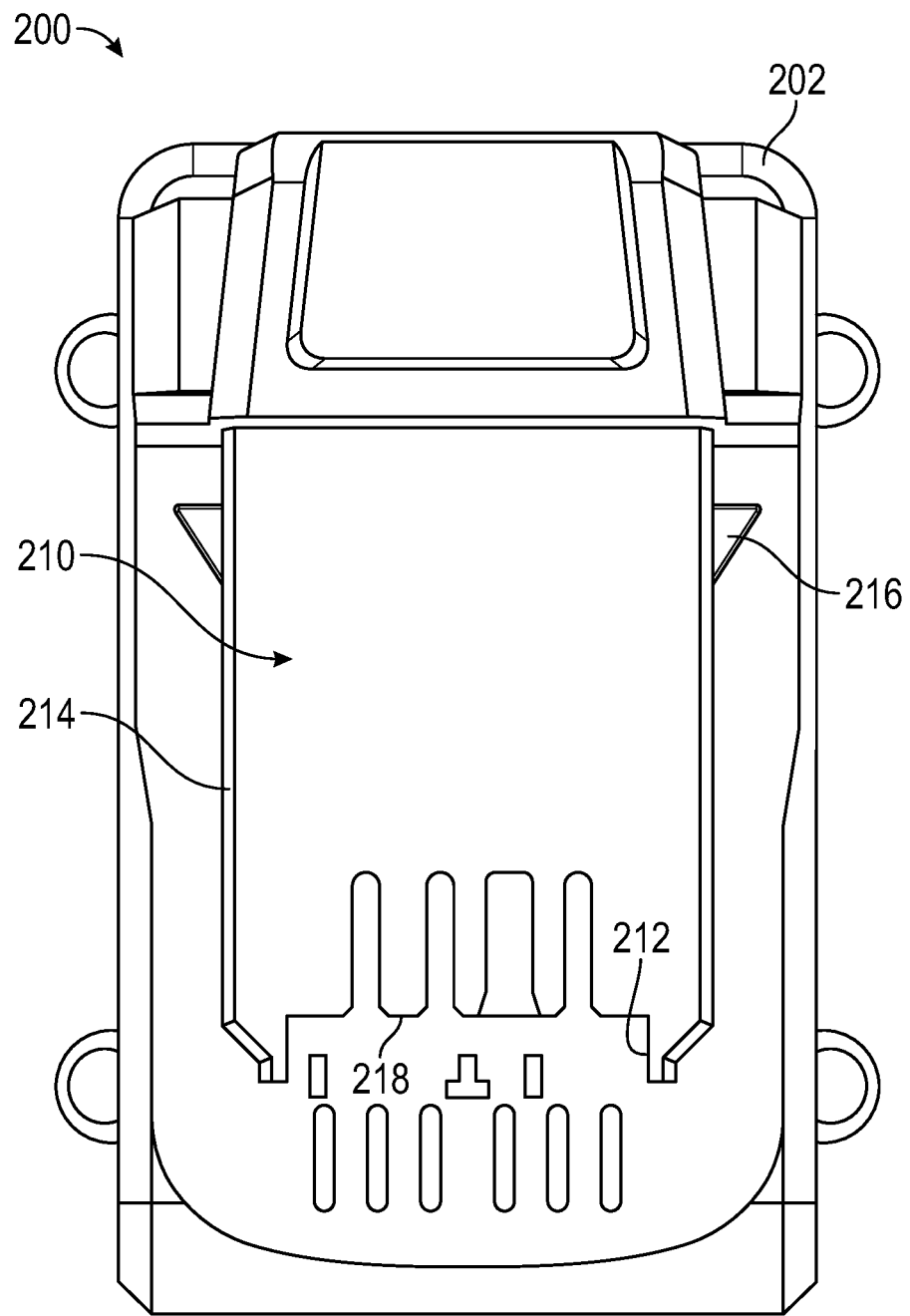
FIG. 3E is a bottom view of the battery of FIG. 3A.
Figure 3F:
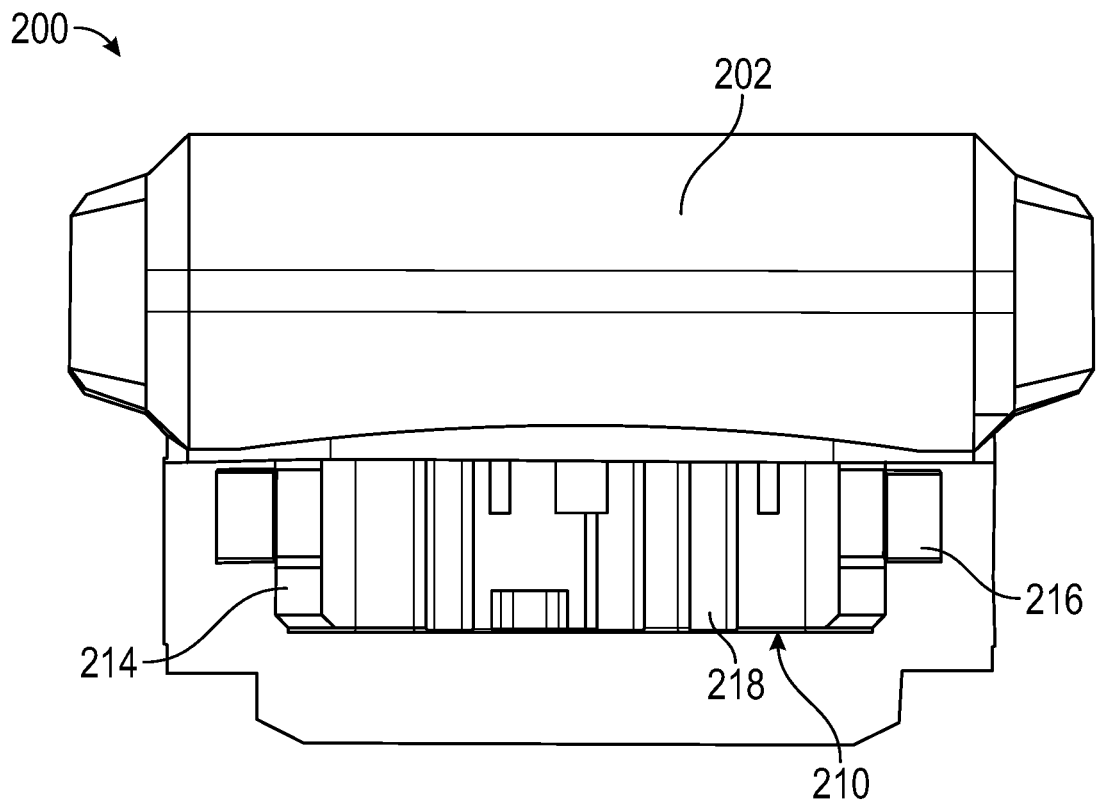
FIG. 3F is a front view of the battery of FIG. 3A.
Figure 3G:
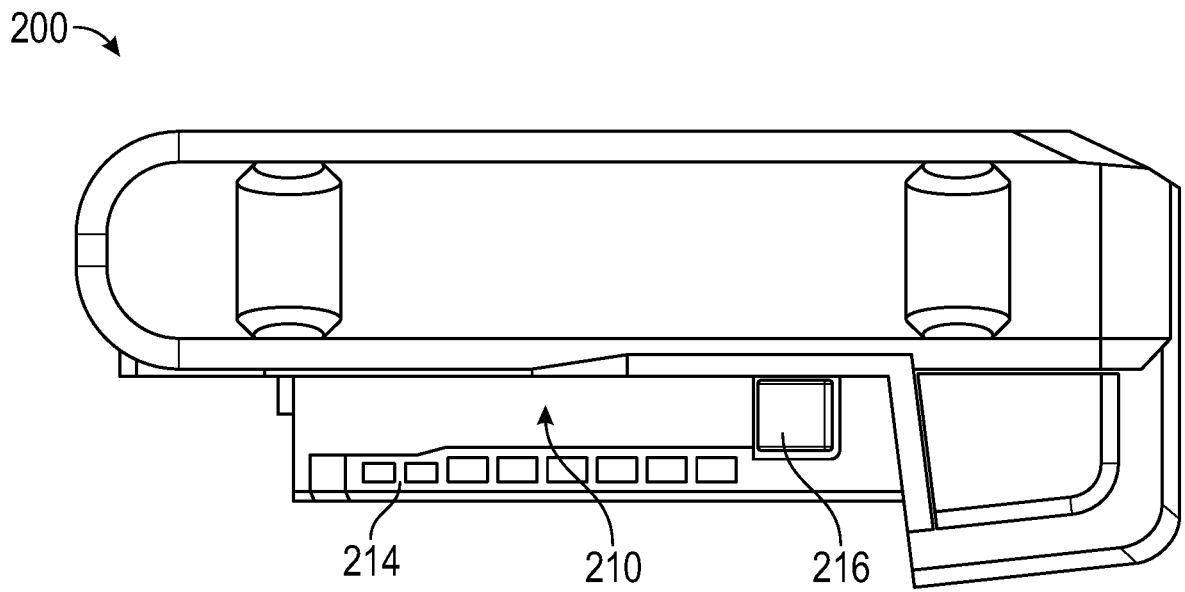
FIG. 3G is a left side view of the battery of FIG. 3A.
Figure 4:
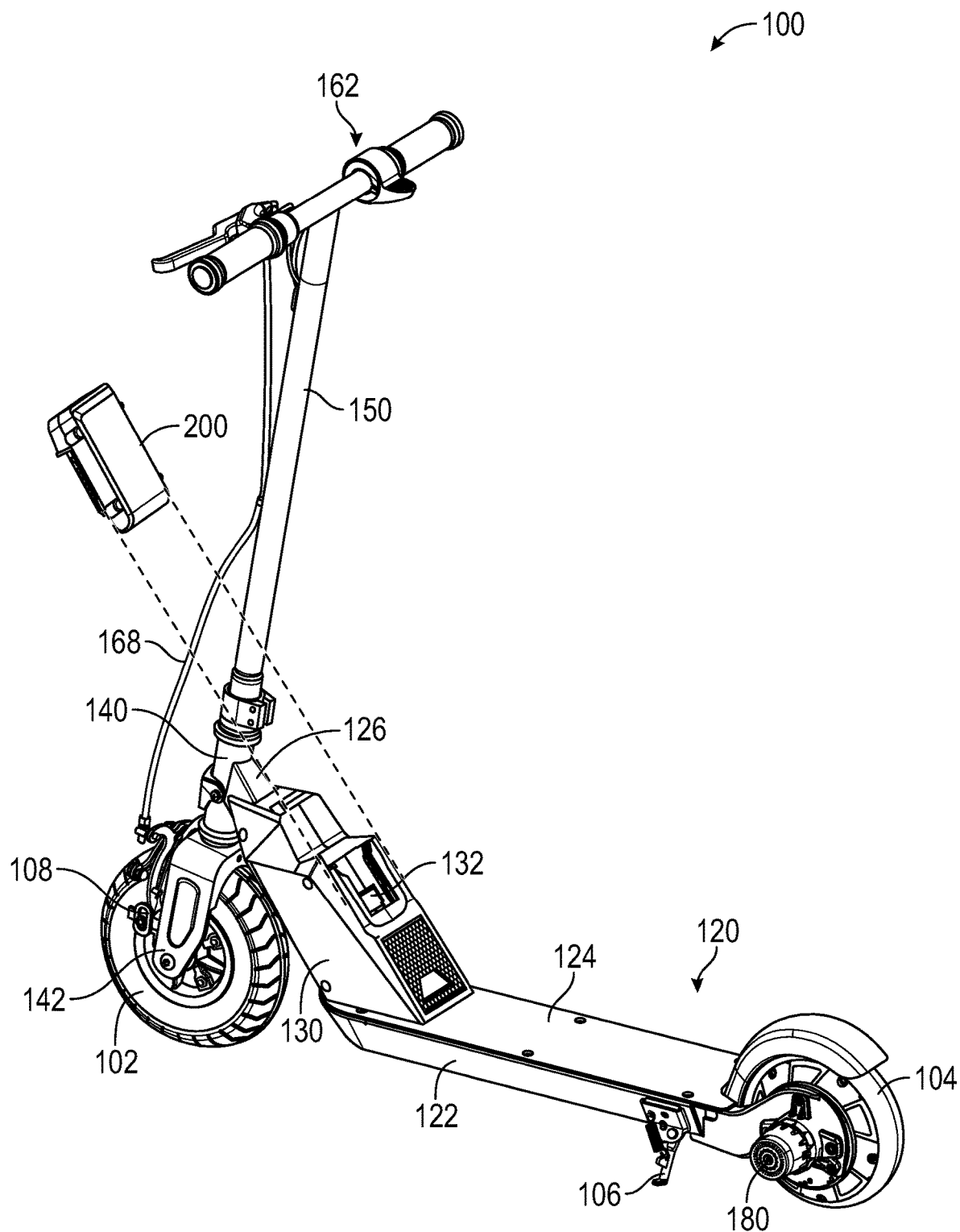
FIG. 4 is an exploded perspective view of the scooter of FIG. 1, shown with the battery in a removed state.
Figure 5A:
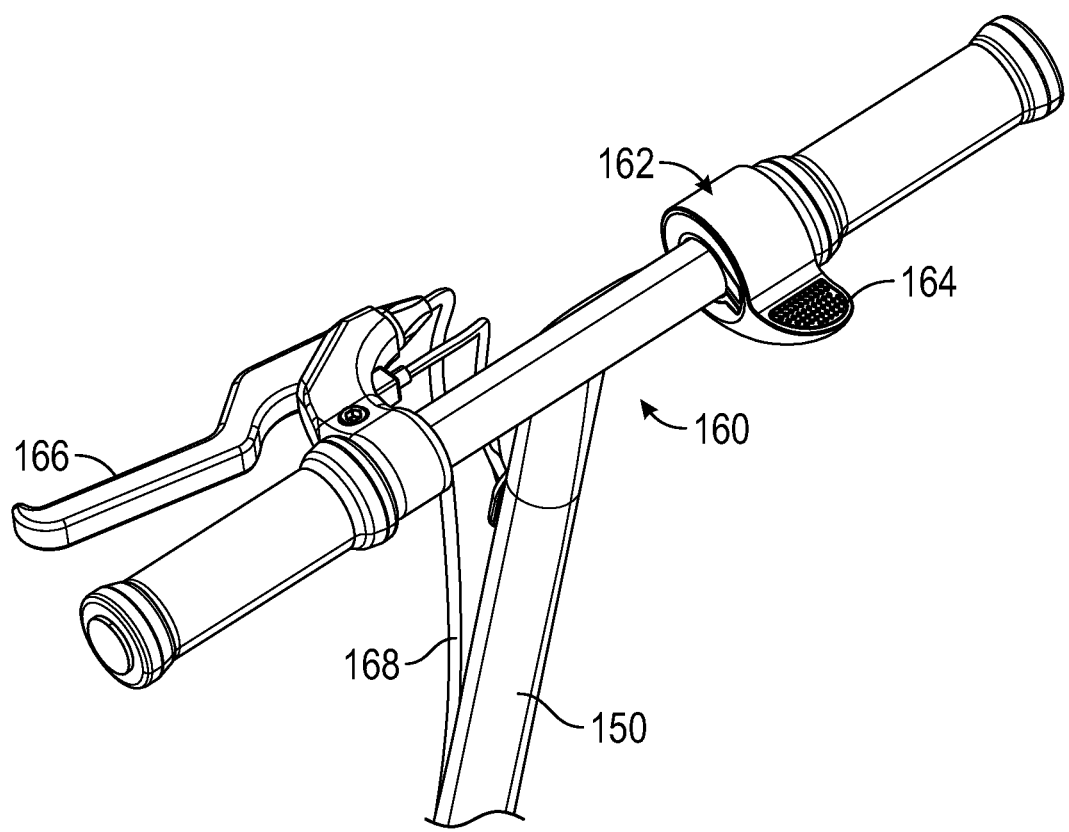
FIG. 5A is a perspective view of a handlebar arrangement of a scooter with a removable multi-function battery, such as the scooter of FIG. 1.
Figure 5B:
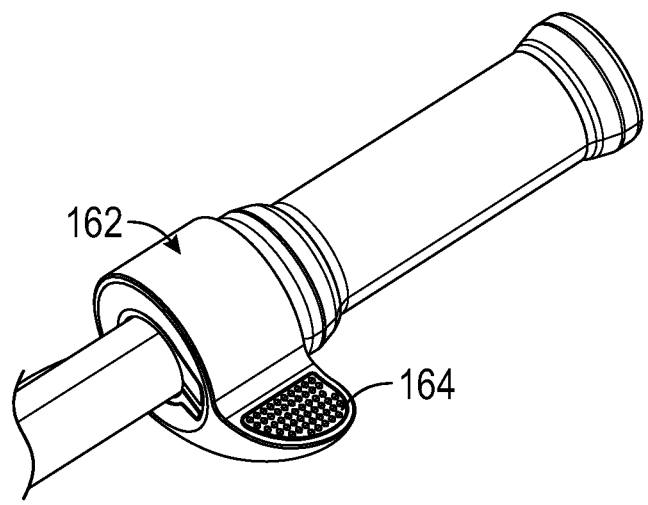
FIG. 5B is a perspective view of a thumb actuated accelerator of a scooter with a removable multi-function battery, such as the scooter of FIG. 1.
Figure 5C:
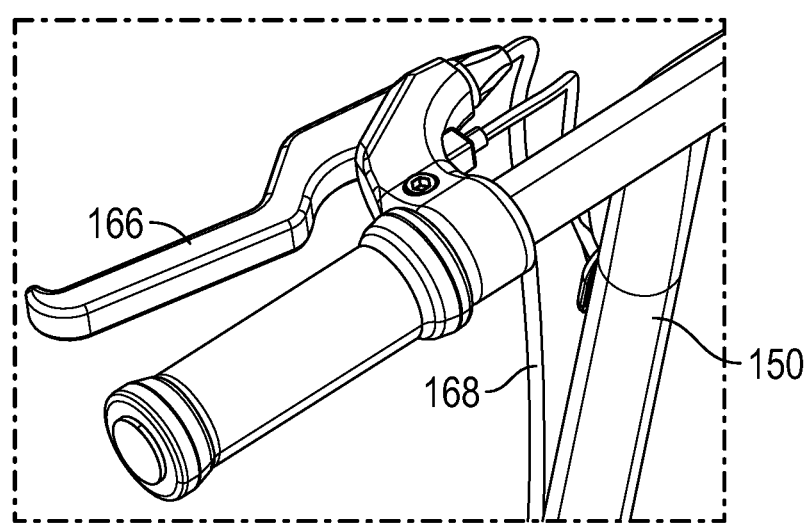
FIG. 5C is a perspective view of a hand brake of a scooter with a removable multi-function battery, such as the scooter of FIG. 1.

FIG. 3A is a top perspective view of a removable multi-function battery, such as the removable battery of the scooter of FIG. 2A. FIG. 3B is a top plan view of the battery of FIG. 3A. FIG. 3C is a rear view of the battery of FIG. 3A. FIG. 3D is a right side view of the battery of FIG. 3A. FIG. 3E is a bottom view of the battery of FIG. 3A. FIG. 3F is a front view of the battery of FIG. 3A. FIG. 3G is a left side view of the battery of FIG. 3A.

The battery 200 may include a connection section 210 located on the underside of the battery 200 and dimensioned to be inserted into and retained by the battery retention region 132 of the housing 130 on the strut portion 126. The battery 200, as well as the battery retention region 132 of the housing 130, may be dimensioned to allow easy insertion and removal of the battery 200, with the battery retention region 132 being spaced apart from the head tube 140 by a distance sufficient to provide clearance for the installation and removal of the battery 200.

Because the battery retention region 132 in the illustrated embodiment is open on its upper side, rather than being a cavity into which the battery 200 is inserted and surrounded on all four sides, a wide variety of possible shapes of batteries 200 may be inserted into the battery retention region 132.

In some embodiments, the battery 200 may be a multi-functional battery, such as a battery which can be used with other devices. For example, the battery 200 may, in some embodiments, be a battery which can also be used with a range of electrically-powered devices and tools (e.g., drills, saws, sanders, air compressors, lights, screwdrivers, staplers, nail guns, paint guns, blowers, radios, heaters and/or coolers, etc.) or other devices. The devices and tools can include a battery retention region 132 and associated connection and retention features may be similar to or identical to similar battery retention regions on those other devices. In some embodiments, a range of batteries of different sizes may be provided, with common or similar connection sections 210 and differing sizes, capacities, or other features. Because, in certain embodiments, the battery retention region 132 is located on the upper surface of the strut portion 126 of the body 120 of the scooter 100, taller and/or wider batteries can be used without interfering with the operation of the scooter 100.

The connection section 210 on the underside of the battery 200 may be dimensioned to facilitate installation of the battery 200 into the battery retention region 132. The connection section 210 may include a pair of leading prongs 212 which can guide the connection section into the battery retention region 132. The lowermost portion of the connection section 210 then widens outward into flanges 214 which are spaced apart from the overlying section of the battery housing 202. These flanges 214 may be inserted into corresponding features in the connection section 210 in a direction generally parallel to a longitudinal axis of the strut portion 126, and once engaged, will inhibit movement of an installed battery 200 in a direction generally perpendicular to a longitudinal axis of the strut portion 126.

The connection section 210 also includes a pair of biased retention structures 216 extending laterally outward beyond the outer sidewalls of the flanges 214, to provide a latch connection between the battery 200 and the scooter 100. In the illustrated embodiment, the biased retention structures 216 comprise movable triangular prongs, although a wide variety of other types and shapes of retention structures may also be used. The biased retention structures 216 can be pressed laterally inward into the connection section 210, to a point substantially parallel with or inward of the sidewalls of the flanges 214. The leading surfaces of the biased retention structures 216 may have an angled profile. The engagement of the leading surfaces of the biased retention structures 216 with stop features in the battery retention region 132 presses the biased retention structures 216 inward and allows passage of the battery 200 further into the battery retention region 132.

Once the biased retention structures 216 have passed the stop features, the biased retention features 216 may spring back outward. The trailing surfaces of the biased retention structures 216, which are generally perpendicular to the outer sidewalls of the flanges 214, inhibit the battery 200 from being pulled back out of the battery retention region 132, helping to retain the installed battery 200 in place.

The biased retention structures 216 may be operably connected to a release feature, such as a pair of buttons or levers which can be squeezed or otherwise engaged by a user to pull the biased retention structures 216 back into the battery 200, permitting retraction of the battery 200 without engaging the stop features, and allowing the battery 200 to be pulled out of the battery retention region 132 in a direction generally parallel to the longitudinal axis of the strut portion 126.

In such an embodiment, the latch connection between the scooter 100 and the battery 200 may be arranged such that the battery 200 can be installed into the scooter 100 without depressing a button or other release feature. However, removing the battery 200 from the scooter 100 may require depressing a button on the battery 200.

The connection section 210 of the battery 200 also includes a plurality of internal ribs 218 which are located between the leading prongs 212 and set back from the forward points of the leading prongs 212. At least some of the internal ribs 218 may be configured to engage a complementary structure in the battery retention region 132. This mechanical interface can facilitate precise positioning of the battery 200 within the battery retention region 132. In addition, the battery 200 may include contact pads, pins, or other conductive structures on or adjacent these internal ribs 218, to provide one or more electrical connections with corresponding conductive structures within the battery retention region 132 of the housing 130 of the strut portion 126.

The battery 200 may also include a wide variety of additional features. For example, the battery 200 may include a display or another appearance-changing element, such as one or more colored LEDs, which can provide information regarding the status of the battery, including current charge, remaining charge, charge time remaining, and any other suitable information. The battery 200 can also include heat sinks or other passive or active heat dissipation features.

By utilizing a readily interchangeable battery, the battery 200 can easily be removed from the scooter 100 and can be recharged using a separate charging unit. A charged battery 200 can be swapped in for a depleted battery. In an embodiment in which the battery 200 is a multifunctional battery which can be used in conjunction with other devices, such as power tools, both batteries and charging stations may be readily and widely available. The open design of the battery retention region 132 allows the use of a wide range of sizes and capacities of the batteries 200 and can provide a user with the ability to adjust the range of the scooter 100 by adjusting the size and capacity of the battery 200 used with the scooter 100.

The placement of the battery 200 above the support surface 124 of the scooter 100, rather than underneath the support surface 124 of the scooter 100, can provide additional flexibility in the design of the deck section 122 and support surface 124 of the scooter 100. In some embodiments, the use of an overlying battery 200 can allow for a support surface 124 which is closer to the ground than might be possible if the battery were stored underneath the support surface 124. In addition, the overlying placement of the battery 200 can provide protection from damage to the battery 200 which might occur if the battery 200 were located underneath the support surface 124.

Certain terminology may be used in the description for the purpose of reference only, and thus is not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes, or tends toward, a particular value, amount, or characteristic. For example, as the context may dictate, the term "generally parallel" can mean something that departs from exactly parallel by less than or equal to 15°.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Various powered mobility systems and vehicles have been disclosed in the context of certain embodiments and examples above. However, this disclosure extends beyond the specifically disclosed embodiments to other alternative embodiments and/or uses and obvious modifications and equivalents thereof. In particular, while the powered mobility systems have been described in the context of illustrative embodiments, certain advantages, features, and aspects of the powered mobility systems may be realized in a variety of other applications. Various features and aspects of the disclosed embodiments can be combined with or substituted for one another in order to form varying modes of the improvements. The scope of this disclosure should not be limited by the particular disclosed embodiments described herein.

Additionally, various aspects and features of the embodiments described can be practiced separately, combined together, or substituted for one another. A variety of combination and subcombinations of the disclosed features and aspects can be made and still fall within the scope of this disclosure. Certain features that are described in this disclosure in the context of separate implementations can also be implemented in combination in a single implementation. Conversely, various features that are described in the context of a single implementation can also be implemented in multiple implementations separately or in any suitable subcombination. Although features may be described above as acting in certain combinations, one or more features from a claimed combination can, in some cases, be excised from the combination, and the combination may be claimed as any subcombination or variation of any subcombination.

Some embodiments have been described in connection with the accompanying drawings. The figures are drawn to scale, but such scale should not be interpreted as limiting, since dimensions and proportions other than what are shown are contemplated and are within the scope of this disclosure. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

In summary, various embodiments and examples of powered mobility systems and vehicles have been disclosed. Although the improvements have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular embodiments described above, but should be determined only by a fair reading of the claims that follow.

The following is claimed:

1. An electric scooter comprising:
   a body;
   a front wheel and a rear wheel;
   a motor operably coupled to the rear wheel and configured to drive the rear wheel;
   a removable battery configured to power the motor;
   a handlebar assembly comprising a handlebar and a shaft, the shaft rotatable with respect to the body, the front wheel rotationally coupled to the shaft;
   the body comprising:
     a support surface configured to support a user; and
     a strut extending between the support surface and the rotatable shaft; and
   a battery receptacle configured to receive and releasably retain a removable battery configured to power the motor, wherein the battery receptacle is supported by the strut;
   wherein the removable battery and the battery receptacle comprise corresponding flanges and rails extending in a direction generally parallel to a longitudinal axis of the strut; and wherein the corresponding flanges and rails, when engaged, inhibit movement of the removable battery in a direction generally perpendicular to the longitudinal axis of the strut portion.

2. The electric scooter of claim 1, wherein the battery receptacle is oriented to receive the removable battery in a direction generally parallel to a longitudinal axis of the strut.

3. The electric scooter of claim 2, wherein the battery receptacle is located over an upper surface of the strut.

4. The electric scooter of claim 1, wherein the battery receptacle is configured to make a latching connection with the removable battery.

5. The electric scooter of claim 1, wherein at least one of the battery receptacle and the removable battery comprises a biased retention structure configured to allow insertion of the removable battery into the battery receptacle while inhibiting removal of the removable battery from the battery receptacle.

6. The electric scooter of claim 1, wherein the battery receptacle is located forward of the support surface of the body.

7. The electric scooter of claim 6, wherein a dimension of the battery receptacle in a direction parallel to a longitudinal axis of the strut is less than a distance between the battery receptacle and the rotatable shaft.

8. An electric scooter, comprising:
a front wheel rotationally coupled to a rotatable shaft and a handlebar assembly;
a rear wheel coupled to a driving motor configured to drive the rear wheel;
a scooter body comprising:
 a deck configured to support a rider thereon; and
 a strut extending between the deck and the deck and a main tube configured to retain the rotatable shaft; and
a battery configured to releasably connect to the scooter body and configured to power the driving motor, wherein the battery is a power tool battery; and
wherein, when the battery is connected to the scooter body, the battery is positioned between at least a portion of the front wheel and at least a portion of the rear wheel and at least a portion of the battery is vertically above the deck.

9. The electric scooter of claim 8, wherein the entire battery is positioned vertically above the deck.

10. The electric scooter of claim 8, wherein the battery comprises a release button configure to permit detachment of the battery from the scooter body when the release button is pressed.

11. The electric scooter of claim 8, further comprising a throttle assembly configured to control the speed of the electric scooter by adjusting the speed of the driving motor.

12. The electric scooter of claim 11, wherein the throttle assembly comprises a thumb-actuated accelerator supported by the handlebar assembly.

13. The electric scooter of claim 8, wherein the strut is oriented at an oblique angle to the deck, and wherein the battery is supported by the strut.

14. The electric scooter of claim 8, wherein the strut supports a housing defining a battery receptacle, the battery releasably inserted in the battery receptacle.

15. The electric scooter of claim 14, wherein the battery receptacle is located in an upper surface of the body.

16. The electric scooter of claim 8, wherein the battery is a power drill battery.

17. The electric scooter of claim 8, wherein, when the battery is connected to the scooter body, the battery is further positioned on an outside surface of the strut and is at an angle of approximately 45° relative to the deck.

18. A combination comprising the electric scooter of claim 8 and the power tool.

19. The electric scooter of claim 1, wherein the removable battery comprises the flanges and the battery receptacle comprises the rails.

20. The electric scooter of claim 1, wherein the removable battery comprises a power tool battery.

* * * * *